(12) United States Patent
Topliss et al.

(10) Patent No.: US 12,093,446 B1
(45) Date of Patent: *Sep. 17, 2024

(54) DIRECT RETINAL PROJECTOR

(71) Applicant: Apple Inc., Cupertino, CA (US)

(72) Inventors: Richard J. Topliss, Campbell, CA (US); James H. Foster, London (GB); Alexander Shpunt, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 17/473,901

(22) Filed: Sep. 13, 2021

Related U.S. Application Data

(63) Continuation of application No. 15/413,310, filed on Jan. 23, 2017, now Pat. No. 11,157,072.

(60) Provisional application No. 62/299,137, filed on Feb. 24, 2016.

(51) Int. Cl.
| | |
|---|---|
| *G06F 3/01* | (2006.01) |
| *G02B 26/08* | (2006.01) |
| *G02B 27/01* | (2006.01) |
| *G06T 19/00* | (2011.01) |

(Continued)

(52) U.S. Cl.
CPC ......... *G06F 3/013* (2013.01); *G02B 26/0833* (2013.01); *G02B 27/0172* (2013.01); *G02B 27/0179* (2013.01); *G06V 40/19* (2022.01); *H04N 5/33* (2013.01); *G02B 2027/0178* (2013.01); *G02B 2027/0187* (2013.01); *G06T 19/006* (2013.01)

(58) Field of Classification Search
CPC ......... G06F 3/013; G06F 3/015; G06V 40/18; G06V 40/19; G06V 20/20; G02B 26/0833; G02B 26/101; G02B 27/0172; G02B 27/0179; G02B 27/104; G02B 27/0093; G02B 2027/0178; G02B 2027/0187; G02B 3/14; H04N 5/33; G06T 19/006
USPC ............................................. 348/78
See application file for complete search history.

(56) References Cited

U.S. PATENT DOCUMENTS

| | | |
|---|---|---|
| 9,077,973 B2 | 7/2015 | Aguren |
| 9,529,191 B2 | 12/2016 | Sverdrup et al. |

(Continued)

FOREIGN PATENT DOCUMENTS

| | | |
|---|---|---|
| WO | 2016105282 | 6/2016 |

*Primary Examiner* — John W Miller
*Assistant Examiner* — Sean N. Haiem
(74) *Attorney, Agent, or Firm* — Robert C. Kowert; Kowert, Hood, Munyon, Rankin & Goetzel, P.C.

(57) ABSTRACT

A direct retinal projector may include a gaze tracking system that tracks position of a subject's pupil and automatically adjusts projection of a scanned light field so that the light field enters the pupil. A control loop adjusts a scanning mirror to substantially center an IR beam on a position sensing detector (PSD). In so doing, the scanning mirror is correctly positioned so that the scanned light field from the projector enters the subject's pupil. In addition, a direct retinal projector may include an adjustable focusing element that adjusts focus of a combined light beam generated by a projector as the light beam is scanned to an ellipsoid mirror that reflects the light beam to the subject's pupil. The focusing of the scanned beam may be adjusted as the beam is scanned across the azimuth angle of the curved ellipsoid mirror.

17 Claims, 22 Drawing Sheets

(51) Int. Cl.
  *G06V 40/19* (2022.01)
  *H04N 5/33* (2023.01)

(56) References Cited

U.S. PATENT DOCUMENTS

| | | | | |
|---|---|---|---|---|
| 2006/0007362 | A1* | 1/2006 | Lee | G02B 17/008 |
| | | | | 348/E9.026 |
| 2006/0126079 | A1 | 6/2006 | Bareket et al. | |
| 2008/0013076 | A1 | 1/2008 | Matsui | |
| 2010/0149073 | A1 | 6/2010 | Chaum et al. | |
| 2011/0013249 | A1* | 1/2011 | Desai | G02B 26/0833 |
| | | | | 359/213.1 |
| 2012/0265479 | A1* | 10/2012 | Bridges | G01C 3/08 |
| | | | | 702/135 |
| 2013/0070234 | A1 | 3/2013 | Li et al. | |
| 2014/0293246 | A1* | 10/2014 | Takemoto | G02B 26/10 |
| | | | | 359/198.1 |
| 2015/0077842 | A1* | 3/2015 | Kleppe | G02B 21/0072 |
| | | | | 359/380 |
| 2015/0189266 | A1* | 7/2015 | Zhou | H04N 13/271 |
| | | | | 348/54 |
| 2015/0235463 | A1 | 8/2015 | Schowengerdt | |
| 2016/0026253 | A1* | 1/2016 | Bradski | H04N 13/128 |
| | | | | 345/8 |
| 2016/0033771 | A1* | 2/2016 | Tremblay | G02B 26/10 |
| | | | | 359/851 |
| 2016/0041266 | A1 | 2/2016 | Smits | |
| 2016/0089024 | A1 | 3/2016 | Katashiba | |
| 2017/0202457 | A1 | 7/2017 | Swan et al. | |
| 2017/0285343 | A1* | 10/2017 | Belenkii | H04N 13/344 |
| 2017/0299870 | A1 | 10/2017 | Urey et al. | |
| 2018/0246336 | A1* | 8/2018 | Greenberg | G02B 27/0176 |

* cited by examiner

Beam at '-20deg' Azimuth

Beam at '0deg' Azimuth

DIRECT RETINAL PROJECTOR

PRIORITY INFORMATION

This application is a continuation of U.S. patent application Ser. No. 15/413,310, filed Jan. 23, 2017, which claims benefit of priority of U.S. Provisional Application Ser. No. 62/299,137, filed Feb. 24, 2016, the content of which are incorporated by reference herein in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, augmented reality (AR) combines computer generated information with real world images to augment, or add content to, a user's view of the world. The simulated environments of virtual reality and/or the enhanced content of augmented reality may thus be utilized to provide an interactive user experience for multiple applications, such as interacting with virtual training environments, gaming, remotely controlling drones or other mechanical systems, viewing digital media content, interacting with the internet, or the like.

However, conventional virtual reality and augmented reality systems may suffer from accommodation-convergence mismatch problems that cause eyestrain, headaches, and/or nausea. Accommodation-convergence mismatch arises when a VR or AR system effectively confuses the brain of a user by generating scene content that does not match the depth expected by the brain based on the stereo convergence of the two eyes of the user. For example, in a stereoscopic system the images displayed to the user may trick the eye(s) into focusing at a far distance while an image is physically being displayed at a closer distance. In other words, the eyes may be attempting to focus on a different image plane or focal depth compared to the focal depth of the projected image, thereby leading to eyestrain and/or increasing mental stress. Accommodation-convergence mismatch problems are undesirable and may distract users or otherwise detract from their enjoyment and endurance levels (i.e. tolerance) of virtual reality or augmented reality environments.

SUMMARY

Various embodiments of methods and apparatus for providing virtual reality (VR) or augmented reality (AR) systems are described. Embodiments of a direct retinal projector are described that may, for example, resolve the convergence-accommodation conflict in head-mounted AR and VR systems. A VR or AR headset system is described that may include or implement different techniques and components of the direct retinal projector.

Embodiments of a gaze tracking component or system are described that may be used in a direct retinal projector system to track position of a subject's pupil and automatically adjust projection of a scanned light field generated by a projector component of the system so that the scanned light field from the projector enters the subject's pupil. In some embodiments, a control loop adjusts a two-dimensional (2D) scanning mirror to substantially center an IR beam on a position sensing detector (PSD). In so doing, the 2D scanning mirror is correctly positioned so that the scanned light field from the projector enters the subject's pupil.

In addition, embodiments of a beam focusing system for a direct retinal projector system are described. In some embodiments, the beam focusing system may include an adjustable focusing element to provide adaptive optical functionality for the projector. In some embodiments, the adjustable focusing element may be located on the path of a combined light beam generated by light sources of the projector component of the direct retinal projector system and a scanning mirror of the projector component. In some embodiments, the direct retinal projector system adjusts focus of a combined light beam generated by the light sources via the adjustable focusing lens as the light beam is scanned to a curved ellipsoid mirror of the direct retinal projector system that reflects the scanned light beam to the subject's pupil. Since the curved ellipsoid mirror has optical power, the focusing of the scanned beam may be adjusted as the beam is scanned across the azimuth angle of the curved ellipsoid mirror.

In various embodiments of a direct retinal projector system, either the gaze tracking component or the adjustable focusing element may be used, or both may be used in combination.

Figure 1:
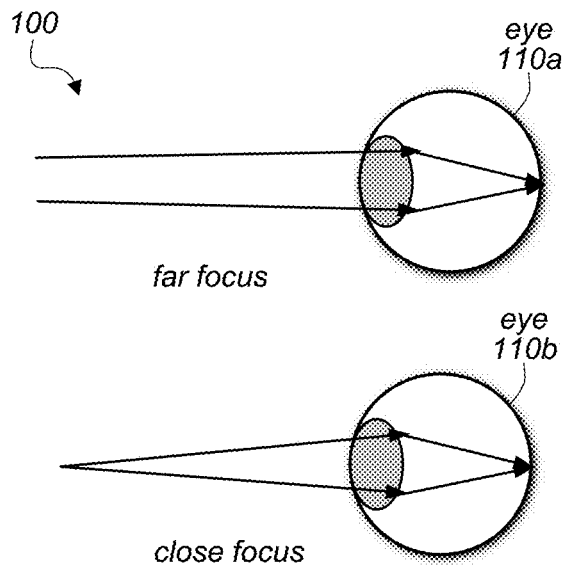
FIG. 1 is an example of different types of eye focus.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing virtual reality (VR) or augmented reality (AR) systems are described. Embodiments of a direct retinal projector are described that may, for example, resolve the convergence-accommodation conflict in head-mounted AR and VR systems. A VR or AR headset system is described that may include or implement different techniques and components of the direct retinal projector.

Embodiments of a gaze tracking component or system are described that may be used in a direct retinal projector system as described herein to track position of a subject's pupil and automatically adjust projection of a scanned light field generated by a projector component of the system so that the scanned light field from the projector enters the subject's pupil. In some embodiments of a gaze tracking component, a light source (e.g., an infrared (IR) LED) projects a beam of IR light. One or more beam splitters help ensure that the IR beam is roughly q to the center of the scanned light field generated by the projector component of the direct retinal projector system. Both the projected light and the IR beam are reflected off a 2D scanning mirror and the curved ellipsoid mirror before reaching the subject's eye. A portion of the IR beam entering the pupil of the eye reflects off the retina and emerges from the pupil again (forming a "bright pupil"). The returning IR beam reflects off the curved ellipsoid mirror, the 2D scanning mirror, and the beam splitters to reach a position sensing detector (PSD), for example a quadrant cell technology PSD (also referred to as a quad cell PSD). A control loop adjusts the 2D scanning mirror to substantially center the returning IR beam on the PSD. In so doing, the 2D scanning mirror is correctly positioned so that the scanned light field from the projector enters the subject's pupil. FIGS. 5A through 7B further illustrate components and methods of operation of a gaze tracking component in a direct retinal projector system, according to at least some embodiments.

In addition, embodiments of an adjustable focusing element (e.g., an adjustable lens), also referred to as an optical actuator component, and focusing method for the projector component of the direct retinal projector system are described. In some embodiments, the adjustable focusing element may be an optical microelectromechanical system (MEMS) configured to dynamically change the shape of a flexible optical element to provide adaptive optical functionality for the projector. In some embodiments, the adjustable focusing element may be located on the path of a combined light beam generated by multiple light sources (e.g., lasers) of the projector component of the direct retinal projector system and a scanning mirror component (e.g., a MEMS mirror module) of the projector component. In some embodiments, a controller component of the direct retinal projector system adjusts focus via the adjustable focusing lens as the light beam generated by the projector component is scanned across the azimuth angle of a curved ellipsoid mirror of the direct retinal projector system that reflects the scanned light beam to the subject's pupil. Since the curved ellipsoid mirror has optical power, the focusing of the scanned beam is adjusted as the beam is scanned across the azimuth angle of the curved ellipsoid mirror. In some embodiments, beam focusing is not changed with the elevation angle during the scan as the direct retinal projector system is rotationally symmetric. In some embodiments, the beam focus may follow a scanning cycle at the projector frame rate (e.g., 60 Hz, 90 Hz, etc.). In some embodiments, the beam generated by the projector and reflected off the curved ellipsoid mirror is not completely collimated when entering the subject's eye, but is focused to the system hyperfocal distance. In some embodiments, depending on system parameters such as beam diameter and resolution which effect the depth of field, the adjustable focusing lens may provide control over the beam focus to enable focusing at object distances closer than half the hyperfocal distance. FIGS. 8A through 11B further illustrate components and methods of operation of an adjustable focusing element in a direct retinal projector system, according to at least some embodiments.

In various embodiments of a direct retinal projector system, either the gaze tracking component or the adjustable focusing element may be used, or both may be used in combination.

FIGS. 12 through 20B and the section titled Example virtual reality device describe embodiments of a virtual reality headset that provide direct retinal projection and that may implement or incorporate embodiments of the scan tracking system, adjustable focus element, and various other methods and apparatus for direct retinal projector systems as described herein. However, note that embodiments of the scan tracking system and adjustable focus element for a projector in a scanning system may be implemented in various other direct retinal projector systems, in other AR or VR technology systems, or in other types of scanning projection systems.

Accommodation and Convergence in AR/VR Systems

The human brain typically uses two cues to gauge distance: accommodation (i.e., eye focus) and eye convergence (i.e., the stereoscopic perspective difference between the two eyes). Conventional near-eye VR systems typically use separate miniature screens for each respective eye to project the images intended for the left eye and the right eye, as well as optics to allow a user to comfortably focus the eyes at a far distance during viewing of the left eye and right eye images. Conventional near-eye VR systems thus produce conflicting visual cues since the resulting three-dimensional (3D) image produced by the brain effectively appears at a convergence distance that is closer than the accommodation distance that each eye focuses on separately, thereby leading to the possibility of headache and/or nausea over time. Heavy users of conventional VR systems may potentially train themselves to compensate for accommodation-convergence mismatch, but a majority of users might not.

AR systems typically add information and graphics to an existing scene being viewed by a user. In some embodiments, AR may be a powerful experience, since the user can see both the projected images and/or sprites (i.e., the augmented world) as well as the surrounding scene (i.e., the real world) directly through the AR system rather than using camera systems to project a version of the surrounding scene less accurately onto screen displays for each eye.

FIG. 1 depicts an example of different types of eye focus. In system 100 of FIG. 1, an eye 110A may be selectively configured to focus at a far distance, as shown by the incident light originating from a distant location and focusing onto the retina (i.e., the back internal surface) of eye 110A by the internal lens of eye 110A. In another embodiment, eye 110A may instead be selectively configured for a close focus scenario, as shown by light from a nearby location being incident upon the eye and focusing onto the retina.

Figure 2:
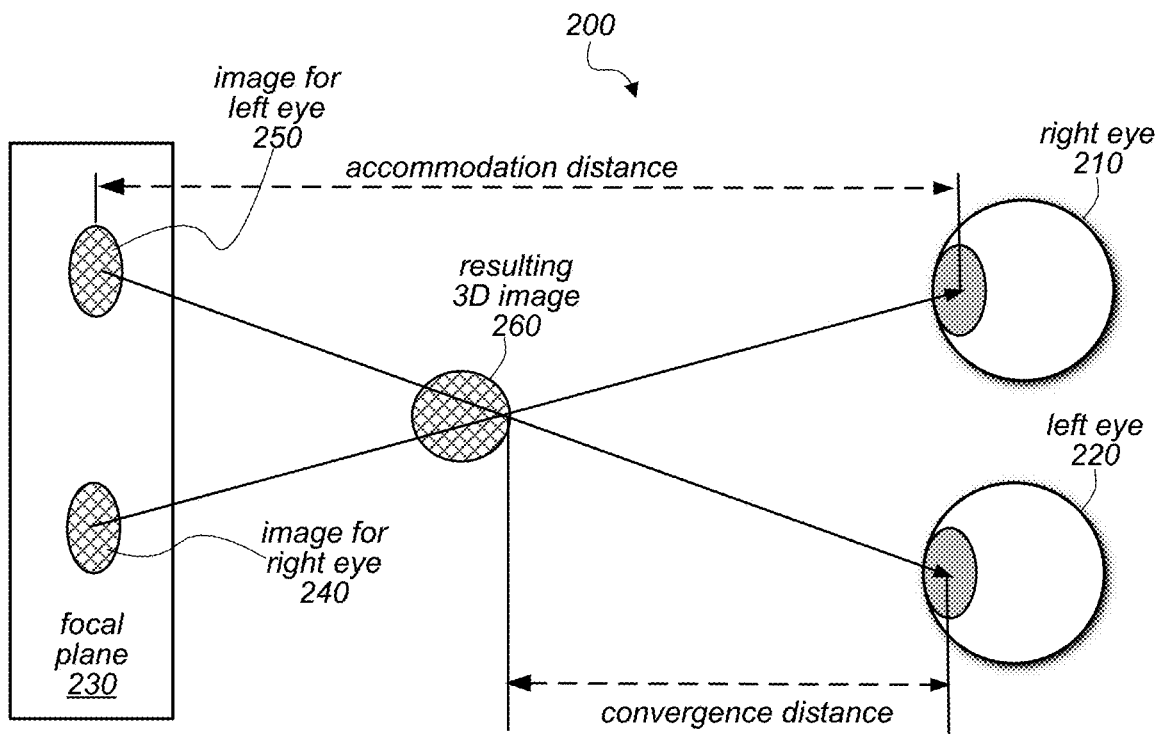
FIG. 2 illustrates one embodiment of a conventional near-eye virtual reality system.

FIG. 2 illustrates one embodiment of a conventional near-eye VR system 200. As depicted, right eye 210 and left eye 220 are focused on a focal plane 230 where an image for right eye 240 and an image for left eye 250, respectively, are displayed. As right eye 210 and left eye 220 focus on their respective images on focal plane 230, the brain of the user combines the images into a resulting 3D image 260. In one embodiment, the accommodation distance may be the distance between focal plane 230 and an eye of the user (e.g., right eye 210 and/or left eye 220), and the convergence distance may be the distance between resulting 3D image 260 and an eye of the user. Since, as depicted in FIG. 2, the accommodation distance differs from the convergence distance, conventional near-eye VR system 200 therefore results in an accommodation-convergence mismatch and may cause discomfort for the user as described above.

Figure 3:
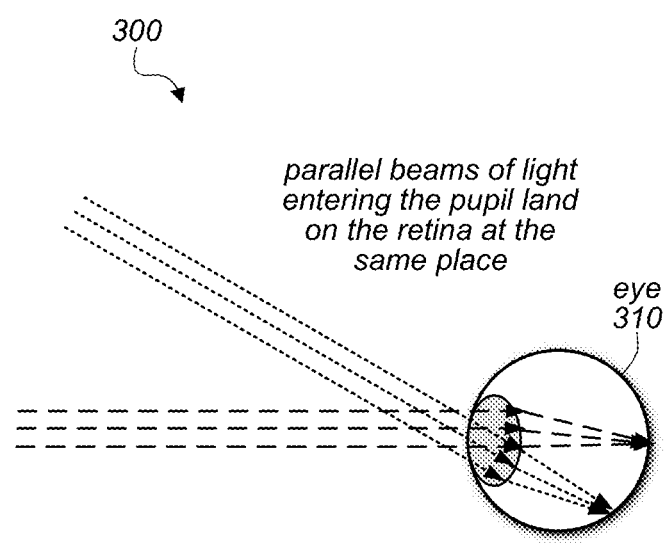
FIG. 3 illustrates an example of parallel light beams entering an eye.

FIG. 3 illustrates an example of parallel light beams entering an eye 300. As shown, various sets of parallel light beams that enter eye 300 are focused by eye 300 such that the parallel beams within a respective set land at the same place on the retina of eye 300.

Direct Retinal Projector System

In embodiments of a direct retinal projector system for AR and/or VR applications as described herein, a light beam is generated by a scanning projector, reflected off a curved mirror (e.g., a curved ellipsoid mirror) in front of the subject's eye and through the subject's pupil, and forms an image on the subject's retina—there is no intermediate image on a screen or surface that the subject views. In some embodiments, with relatively small diameter laser beams, the effective depth of focus of the eye can be greatly increased. The direct retinal projector system may at least partially eliminate eye lens accommodation from the retinal projection focus to help eliminate the accommodation convergence mismatch. In some embodiments, the direct retinal projector system may help compensate for user eye lens problems, such as short- or long-sightedness.

Figure 4A:
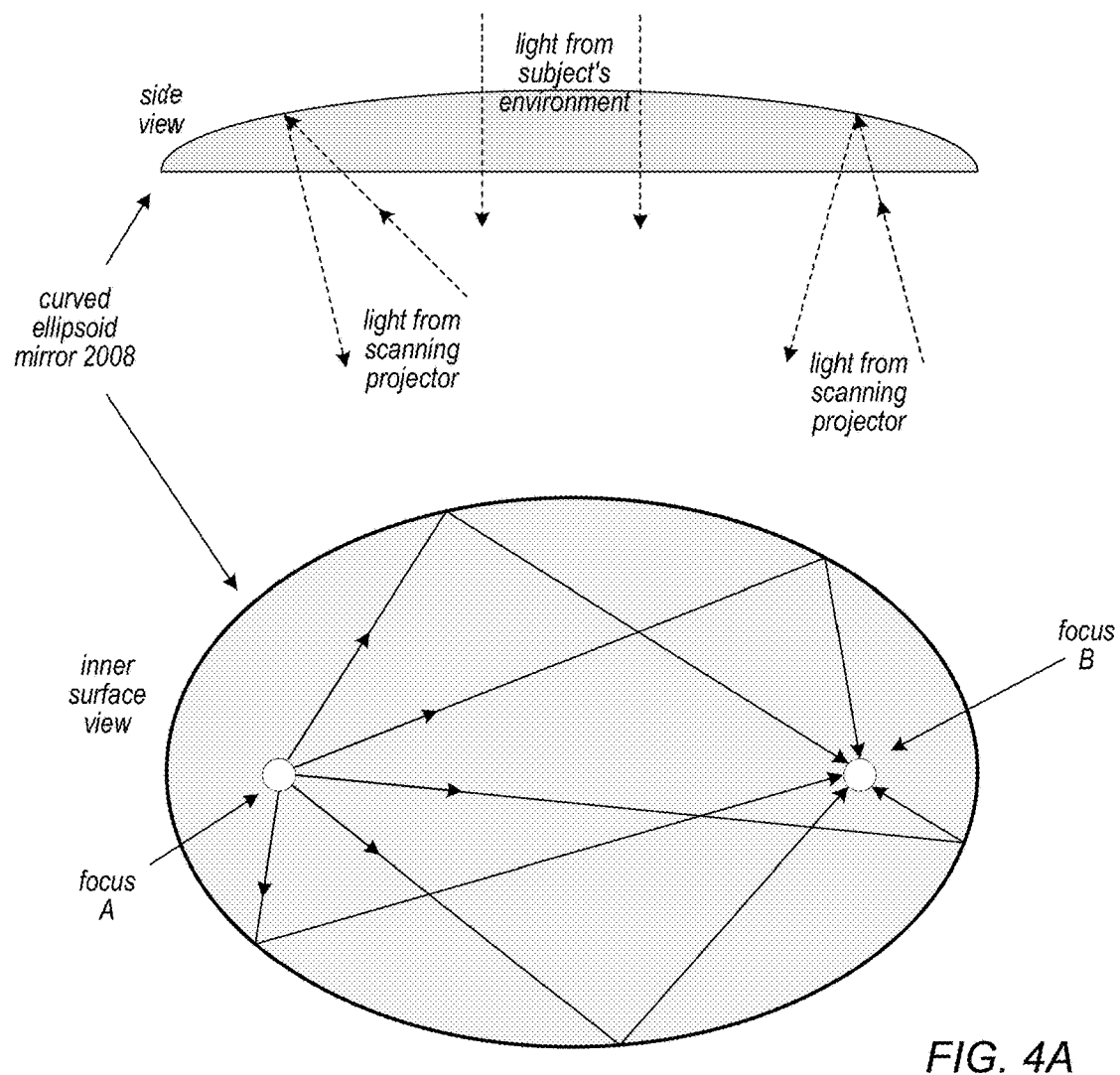
FIG. 4A illustrates a curved, substantially ellipsoid mirror, according to some embodiments.

FIG. 4A illustrates a side view and an inner surface view of a curved ellipsoid mirror 2008, according to some embodiments. The curved ellipsoid mirror 2008 reflects and focuses the light field from the scanning projector into the subject's eye pupil, thus simplifying the optics and reducing the scanning degrees of freedom required when compared to conventional systems. In some embodiments, the curved ellipsoid mirror 2008 may be "see through", i.e. allowing at least some light from the subject's environment to pass through, thus enabling a much more natural augmented reality (AR) experience. For example, AR content projected by the direct retinal projector system may be "overlaid" on or viewed in the environmental scene that the subject is viewing.

Figure 6:
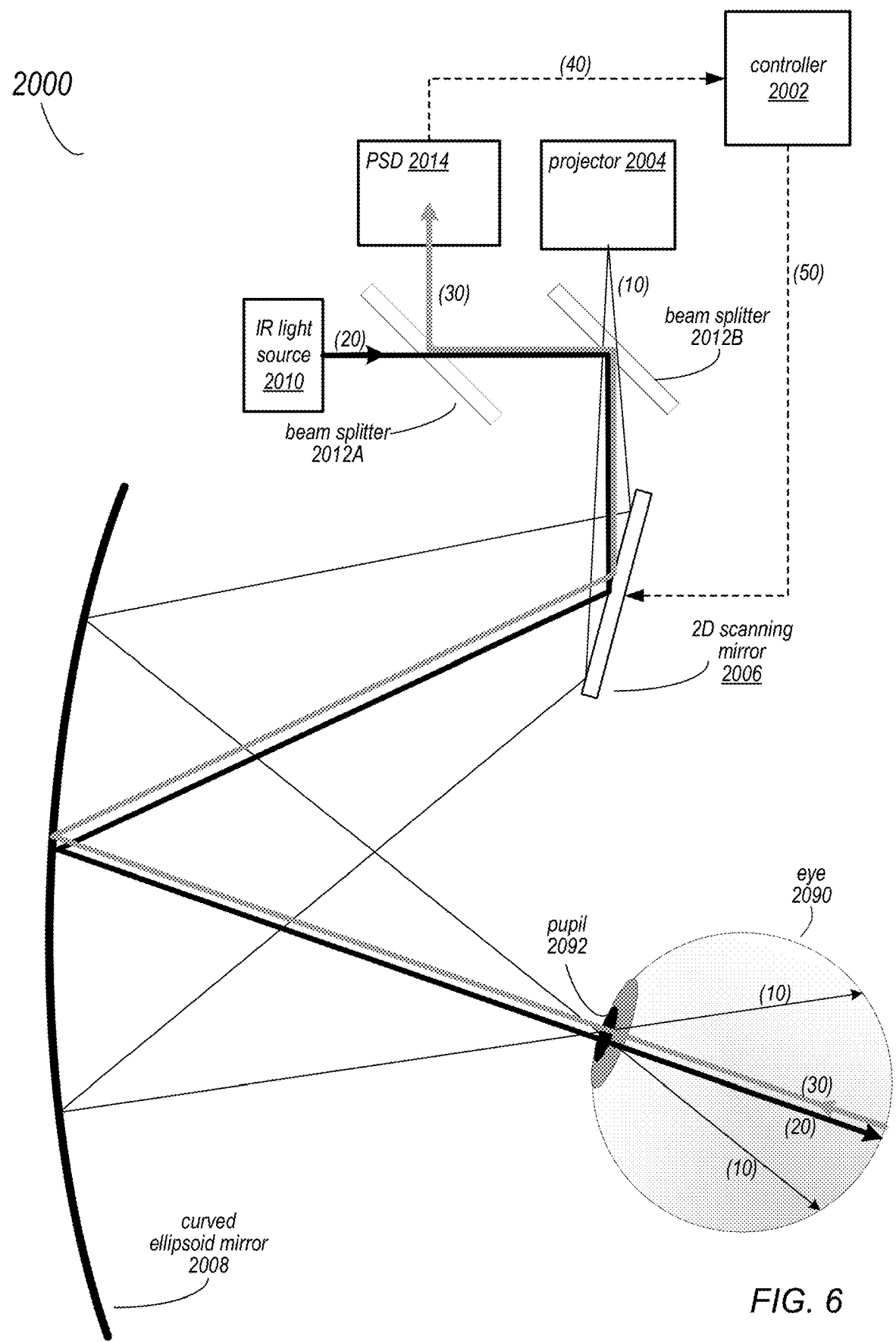
FIG. 6 illustrates a direct retinal projector that includes a gaze tracking system, according to some embodiments.

FIG. 6 illustrates a direct retinal projector system 2000, according to some embodiments. The direct retinal projector system 2000 of FIG. 6 may, for example, be used in a virtual reality headset as shown in FIGS. 12 through 20B. Note that the size, shape, and arrangement of the components within the direct retinal projector system 2000 are provided by way of example and are not intended to be limiting. Also note that there may be more or fewer components in direct retinal projector system 2000 than shown. Further note that the direct retinal projector system 2000 is shown for only one eye; generally but not necessarily, there will be a second direct retinal projector system 2000 for the second eye The projector 2004 scans an image (e.g., an RGB image) (also referred to as a light field 10) into the pupil 2092 of the subject's eye 2090. Light from the projector 2004 is reflected off a 2D scanning mirror 2006 and then the curved ellipsoid mirror 2008 before entering the pupil 2092. In at least some embodiments, the 2D scanning mirror 2006 is not used directly to generate the light field. In some embodiments, the 2D scanning mirror 2006 is part of the gaze tracking system that also includes the IR light source 2010 and the position sensing detector (PSD) 2014. In some embodiments, the angle of the 2D scanning mirror 2006 may be adjusted based on the position of the pupil 2092 of the subject's eye 2090 so that the light field 10 enters the pupil 2092.

Figure 4B:
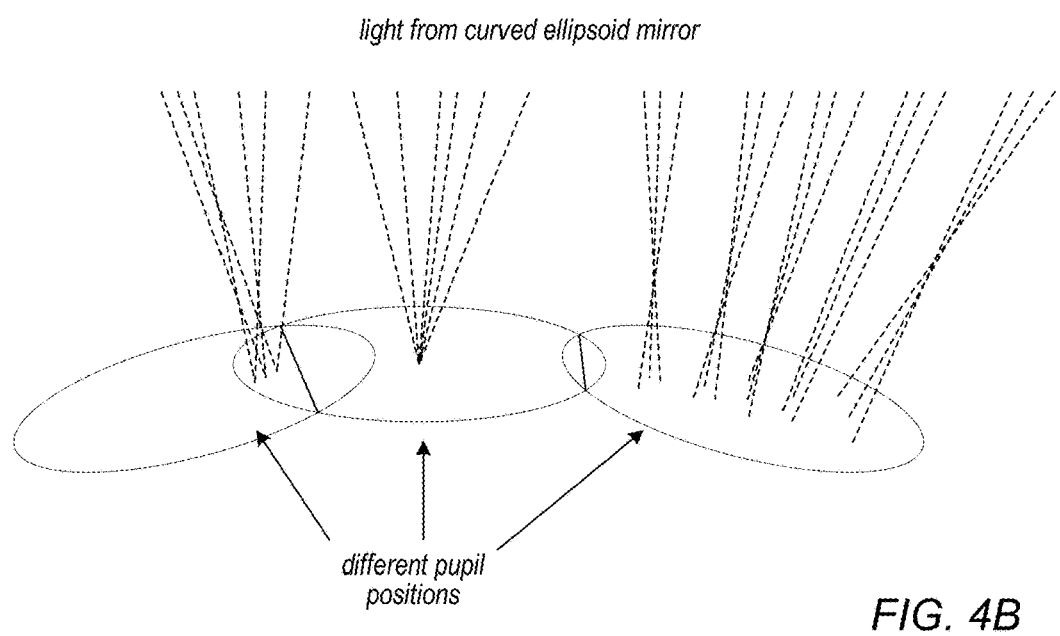
FIG. 4B illustrates light from a curved ellipsoid mirror of a direct retinal projector striking the pupil at different positions, according to some embodiments.

FIG. 4B illustrates light (field rays) from a curved ellipsoid mirror 2008 of a direct retinal projector system 2000 striking the pupil 2092 at different positions, according to some embodiments. In some embodiments, the curved ellipsoid mirror only focuses the light field to a point at one pupil position. At other positions, it focuses to a region. As long as the light enters the pupil, it does not matter where it enters. In some embodiments, the curved ellipsoid mirror 2008 may be modified from the mathematical ellipsoid shape so as to even up the focus region sizes for different pupil positions.

Figure 4C:
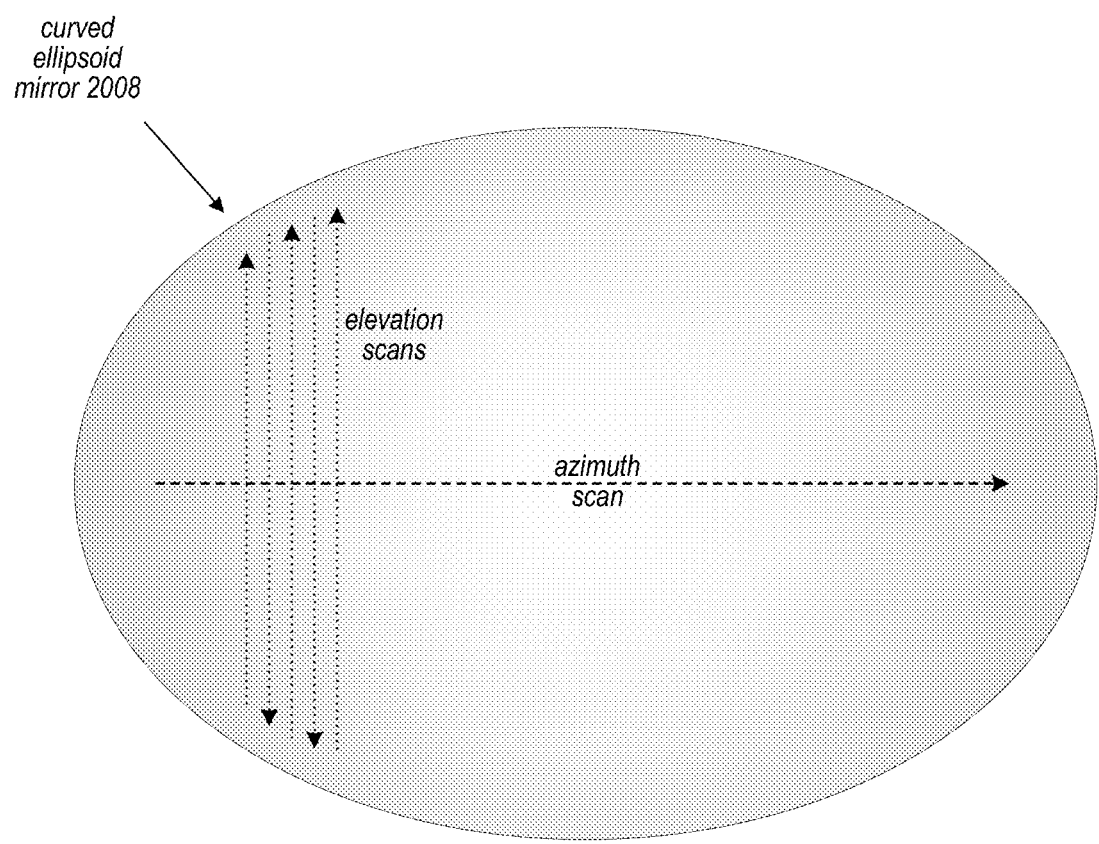
FIG. 4C illustrates elevation and azimuth scans to a curved ellipsoid mirror, according to some embodiments.

FIG. 4C illustrates elevation and azimuth scans to a curved ellipsoid mirror, according to some embodiments. In some embodiments, the scanning projector of the direct retinal projector system may be configured to scan pixels from a source VR or AR image or frame to the curved ellipsoid mirror 2008 in a pattern in which the pixels are scanned on the elevation (fast) axis (each elevation scan corresponding to a column of the source image), with the elevation scans proceeding across the curved ellipsoid mirror 2008 across the azimuth (referred to as the azimuth, or slow, scan). Note that the direction of the arrows in FIG. 4C are given by way of example, and are not intended to be limiting. VR or AR images or frames may be scanned at a frame rate, e.g. 60 or 90 Hz.

The following describes components and operations of a direct retinal projector system 2000 that includes a gaze tracking system, according to some embodiments. Reference is made to FIGS. 6 and 8. In some embodiments, a direct retinal projector system 2000 may include a projector 2004 that generates a combined light beam (e.g., an RGB laser beam) that is scanned using a first 2D scanning mirror (e.g., mirror 3042 of MEMS mirror module 3040 in FIG. 9). In some embodiments, an adjustable focusing element (3020 in FIG. 9) may be located on the path of the combined light beam generated by the light sources 3010 (e.g., lasers) of the projector 2004 and MEMS mirror module 3040. In some embodiments, the direct retinal projector system adjusts focus of the light beam via the adjustable focusing lens 3020 as the light beam is scanned across the azimuth angle of the curved ellipsoid mirror 2008 by the MEMS mirror module 3040.

The scanned combined beam (10 in FIG. 6) is reflected off a second 2D scanning mirror 2006 that is used as part of the gaze tracking system to adjust the location that the scanned light field 10 is projected to (which should be in the location of the eye pupil 2092). In some embodiments, the gaze tracking system uses a sensor (position sensing detector (PSD)) that senses the position of an IR beam 20-30 generated by an IR light source 2010, such as a quad cell or other PSD technology sensor, shown as PSD 2014 in FIG. 6. The IR beam is generated by an IR light source or emitter 2010, such as an IR LED. In some embodiments, beam splitters 2012A and 2012B to align the IR beam 20 with the center of the scanned light field 10 from the projector 2004 before it reflects of the second 2D scanning mirror 2006.

Figure 17:
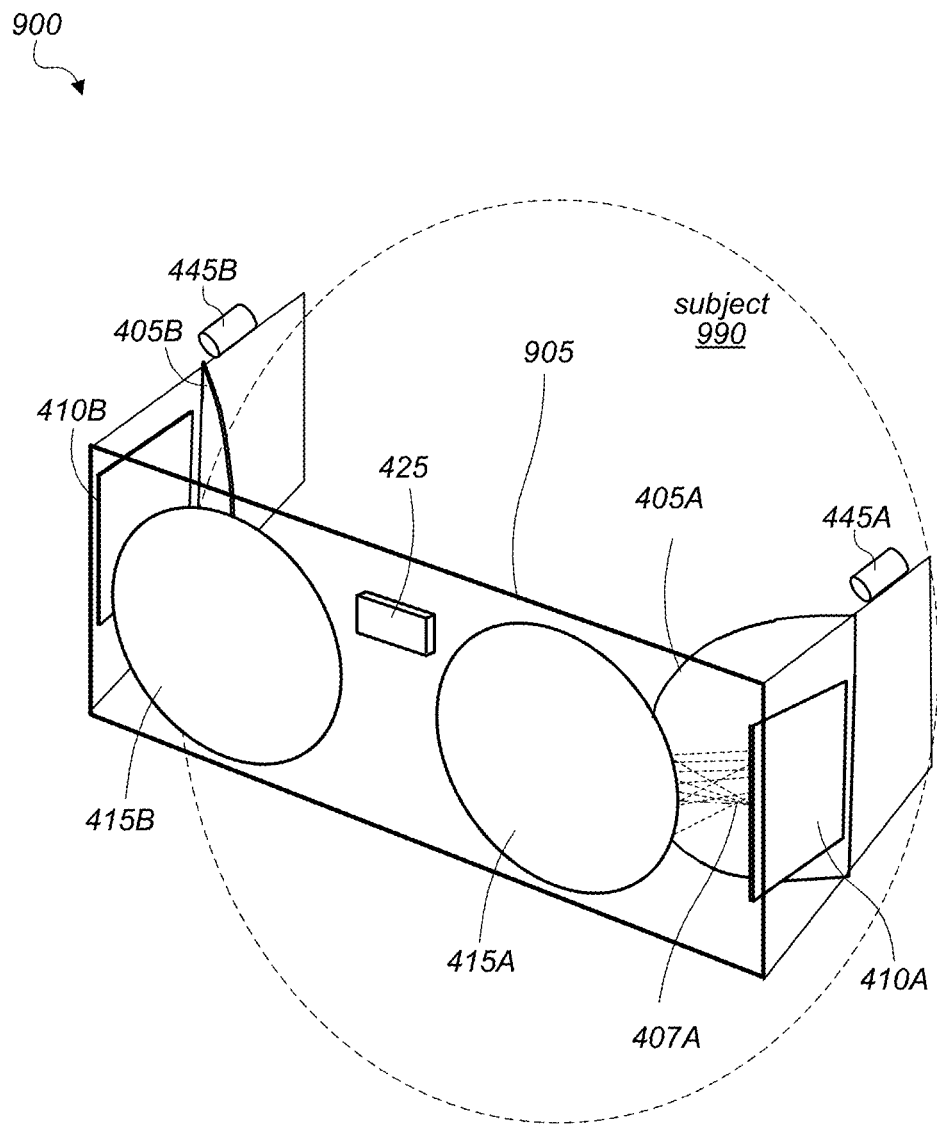
FIG. 17 is a logical block diagram of a frame for a VR/AR device, according to some embodiments.

Once reflected off the second 2D scanning mirror 2006, useful light (visible light in the case of the projected light field 10 and IR light in the case of the gaze tracking system IR beam 20) is reflected off a curved, substantially ellipsoid mirror 2008 located in front of the subject's eye 2090 (with the concave side of the mirror 2008 facing the eye 2090), for example mounted on a frame to which the projector 2004 and gaze tracking apparatus are also attached. An example frame for a virtual reality headset is shown in FIG. 17. In some embodiments, the mirror 2008 may not be exactly ellipsoid so as to optimize the light field focusing over a range of pupil positions, but may be generally close to ellipsoid. The light 10 and 20 is reflected off the mirror 2008 towards the pupil 2092 of the subject's eye 2090.

In the gaze tracking system, at least some of the IR light 20 reflected off the mirror 2008 enters the pupil 2090 and is reflected off the retina back through the pupil 2090 (shown as returning IR beam 30), to create a bright pupil image. The returning IR light beam 30 is reflected back off the curved ellipsoid mirror 2008 and second 2D scanning mirror 2006, and then the returning IR light beam 30 is directed onto the PSD 2014 by one or more beam splitters 2012B. In some embodiments, a control loop (e.g., executed by a controller 2002) is used to alter the angle of the second 2D scanning mirror 2006 according to PSD 2014 sensor data so that the reflected IR beam 30 is substantially centered on the PSD 2014. The angle of the second 2D scanning mirror 2006 may thus be corrected to a position so that the scanned light field 10 from the projector enters the subject's pupil 2092.

TABLE 1 provides parameters for at least some features of example embodiments of a direct retina projection system as described herein. Note that these parameters are provided as examples, and are not intended to be limiting.

TABLE 1

| FEATURES | First example embodiment | Second example embodiment | Comments |
|---|---|---|---|
| Laser beam diameter at projector | 1 mm | 3 mm | Better resolution with bigger beam |
| Resolution pixels/deg. | 20 | >30 | Depends on beam quality, diffraction limited divergence and laser response time |
| Frame rate/Hz | 60 | 90 | |
| FOV at eye (one pupil position)/deg. | 40 | 40 | |
| Range of pupil positions/deg. | +/−7 any direction | +/−10 any direction | |
| Depth of focus for user (beam focused at hyperfocal distance)/m | 0.5 m to ∞ | 1.5 m to ∞ | Smaller beam diameter has better depth of field, but worse resolution (a trade-off) |
| Depth of focus for user (beam focus adjusted to object distance) | — | 0.2 m to ∞ | |

Gaze Tracking System

Embodiments of a gaze tracking component or system are described that may be used in a direct retinal projector system as described herein to track position of a subject's pupil and automatically adjust projection of a scanned light field generated by a projector component of the system so that the scanned light field from the projector enters the subject's pupil.

In some embodiments of a gaze tracking component, a light source (e.g., an infrared (IR) LED) projects a beam of IR light. One or more beam splitters help ensure that the IR beam is roughly centered to the center of the scanned light field generated by the projector component of the direct retinal projector system. Both the projected light and the IR beam are reflected off a 2D scanning mirror and the curved ellipsoid mirror before reaching the subject's eye. A portion of the IR beam entering the pupil of the eye reflects off the retina and emerges from the pupil again (forming a "bright pupil"). The returning IR beam reflects off the curved ellipsoid mirror, the 2D scanning mirror, and the beam splitters to reach a position sensing detector (PSD), for example a quadrant cell technology PSD (also referred to as a quad cell PSD). A control loop adjusts the 2D scanning mirror to substantially center the returning IR beam on the PSD. In so doing, the 2D scanning mirror is correctly positioned so that the scanned light field from the projector enters the subject's pupil.

FIGS. 5A through 7B further illustrate components and methods of operation of a gaze tracking component in a direct retinal projector system, according to at least some embodiments.

Figure 5A:
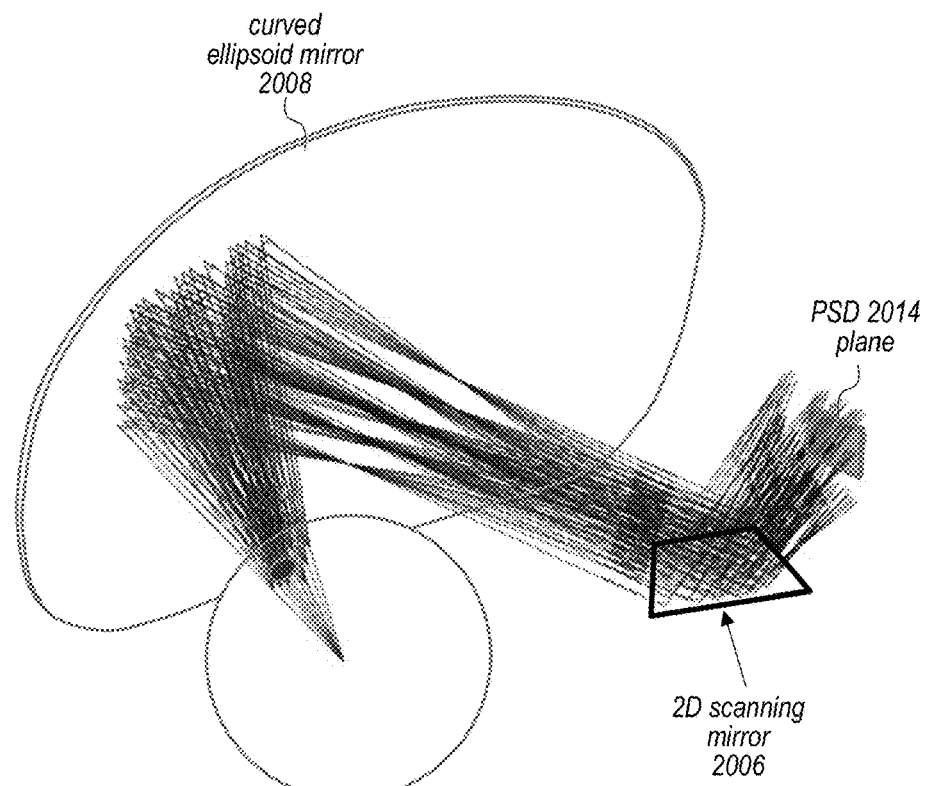
FIGS. 5A and 5B illustrate principle of operation of a gaze tracking system, according to some embodiments.
Figure 5B:
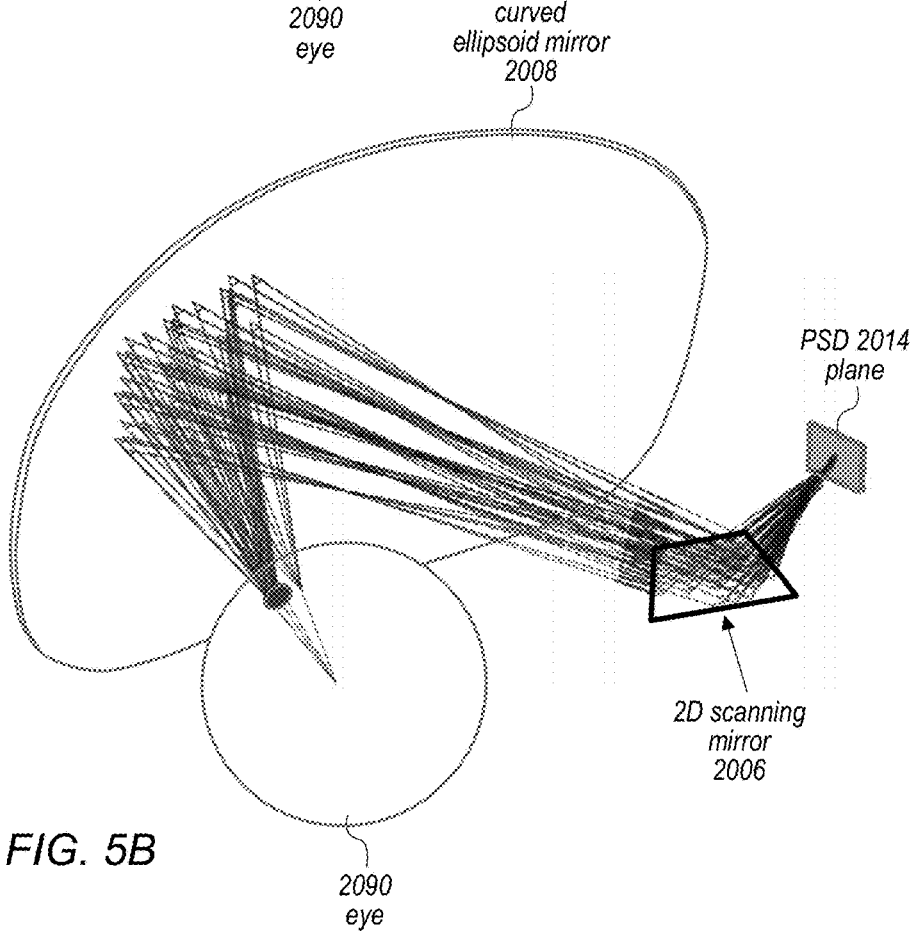

FIGS. 5A and 5B illustrate principle of operation of a gaze tracking system, according to some embodiments. FIG. 5A shows a series of ray bundles from different positions on the eye 2090 and how they reflect off the curved ellipsoid mirror 2008 and 2D scanning mirror 2006 onto the plane of the PSD 2014 (e.g., a quad cell PSD) when the 2D scanning mirror 2006 is in the same neutral position for all ray bundles. Note that there is a reasonably linear mapping between the locations of the ray bundles leaving the surface of the eye 2090 and arriving at the plane of the PSD 2014. Also note that the ray bundles are not perfectly focused to a point at the PSD 2014, but to a region.

In at least some embodiments, the gaze tracking system works by a control loop trying to center the reflected IR ray bundle on the PSD 2014 by adjusting the angle of the 2D scanning mirror 2006, as shown in FIG. 5B. FIG. 5B shows fewer ray bundles leaving the eye surface that FIG. 5A (due to the modeling time), but for each ray bundle the 2D scanning mirror 2006 is at a different angle corresponding to the approximate ideal angle so that the scanned light field from the projector enters the pupil at or near the same position on the eye 2090. While the ray bundles do not perfectly overlap with one another, they are close. This demonstrates that the gaze tracking system operates as required.

In some embodiments, to achieve greater accuracy, the centering position of the ray bundle at the PSD 2014 may be adjusted depending on the open loop drive signal applied to the 2D scanning mirror 2006 to account for any non-linearities.

FIG. 6 illustrates a direct retinal projector that includes a gaze tracking system, according to some embodiments. In some embodiments, the gaze tracking system may include an IR light source 2010 (e.g., an IR LED), first and second beam splitters 2112A and 2112B, 2D scanning mirror 2006, PSD 2014 (e.g., a quad cell technology PSD), and a controller 2002 (e.g., a processor) that implements control loop functionality for the gaze tracking system. In some embodiments, the gaze tracking system may include additional components, for example one or more additional beam splitters used to direct the IR light beam (20) to the 2D mirror 2006 and/or to direct the return IR light beam (30) to the PSD 2014.

Figure 7A:
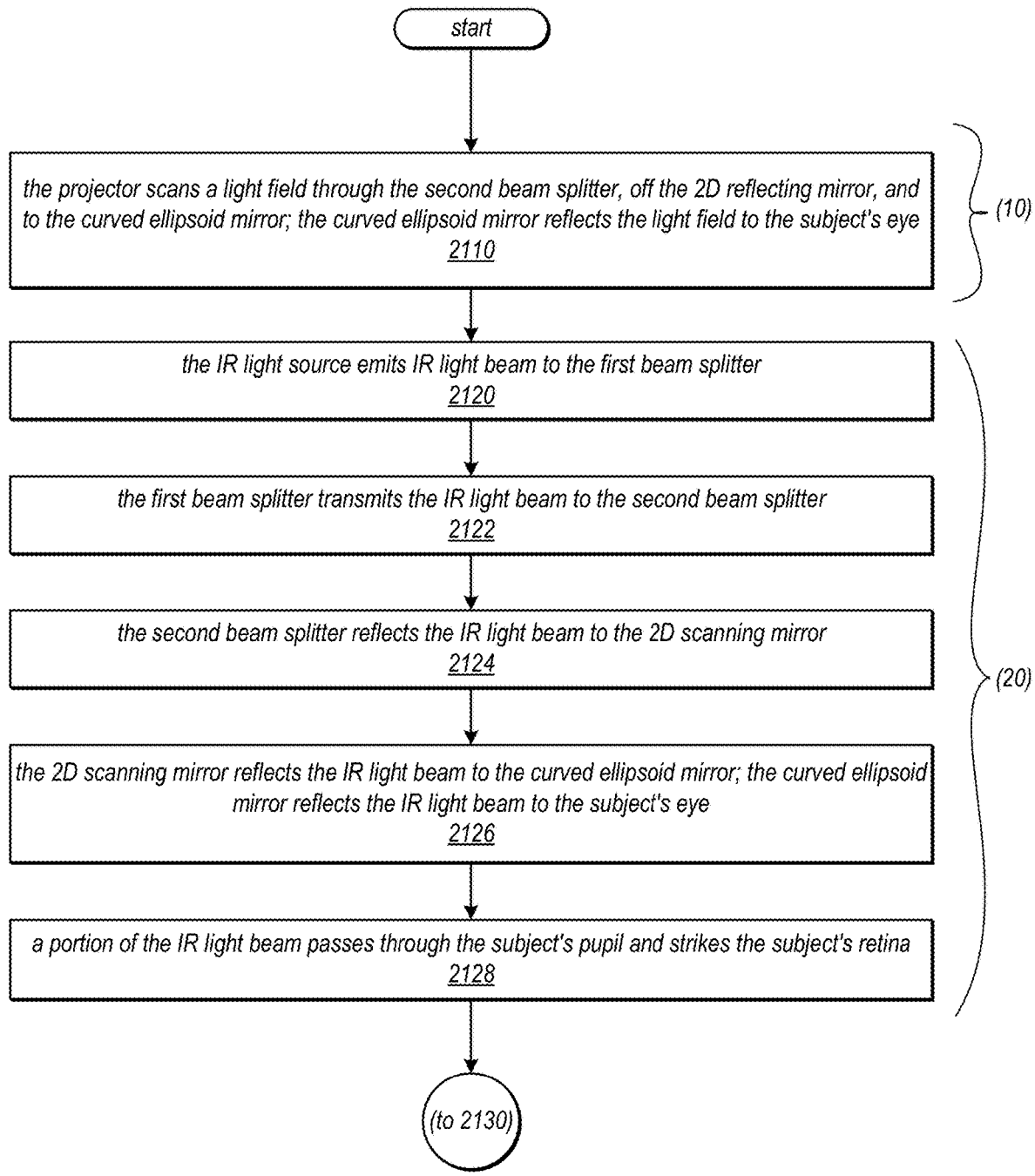
FIGS. 7A and 7B provide a flowchart of a method of operation for a gaze tracking system in a direct retinal projector as shown in FIG. 6, according to some embodiments.
Figure 7B:
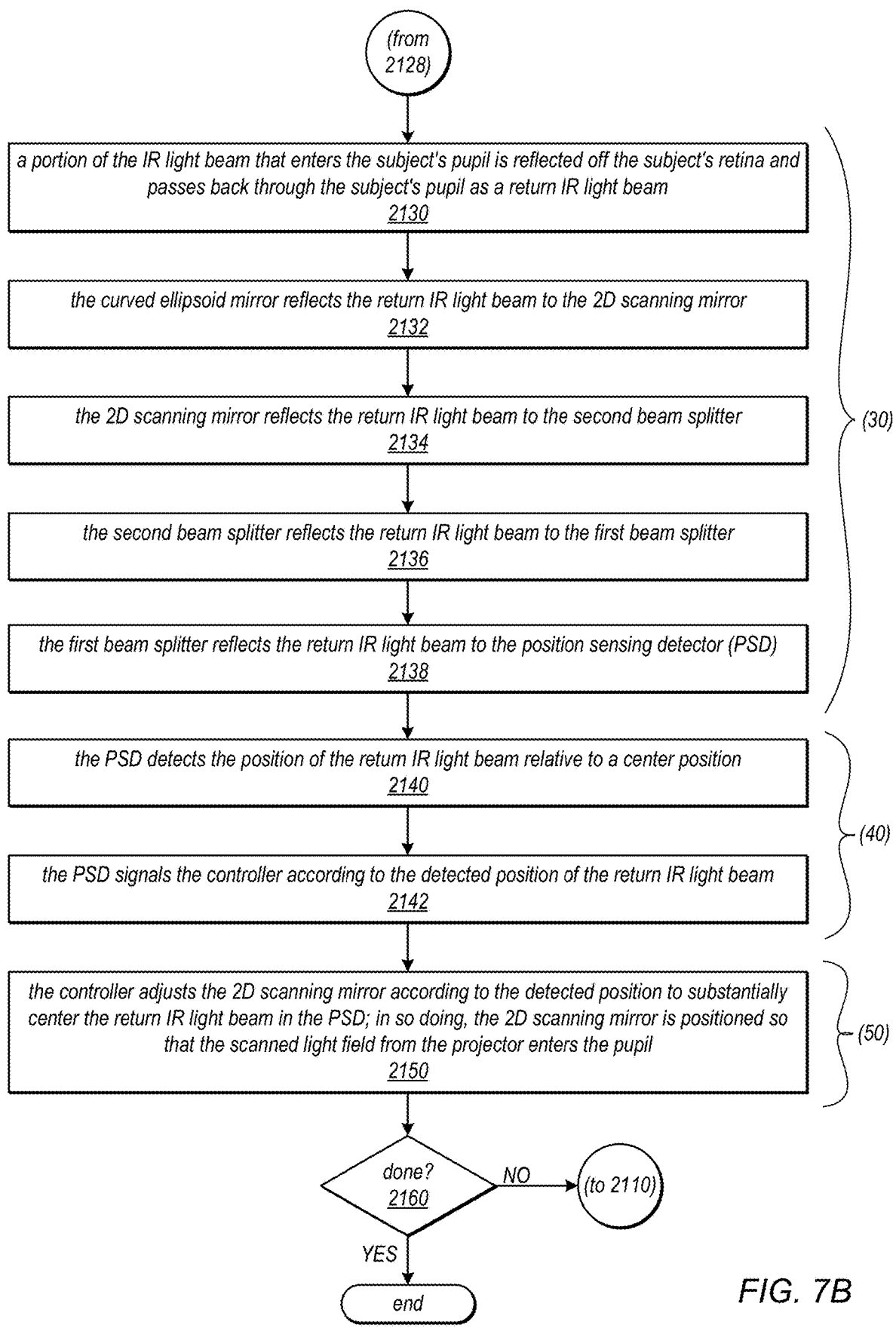

FIGS. 7A and 7B provide a flowchart of a method of operation for a gaze tracking system in a direct retinal projector system 2000, according to some embodiments. The method of FIGS. 7A and 7B may, for example, be performed by the direct retinal projector of FIG. 6.

Figure 9:
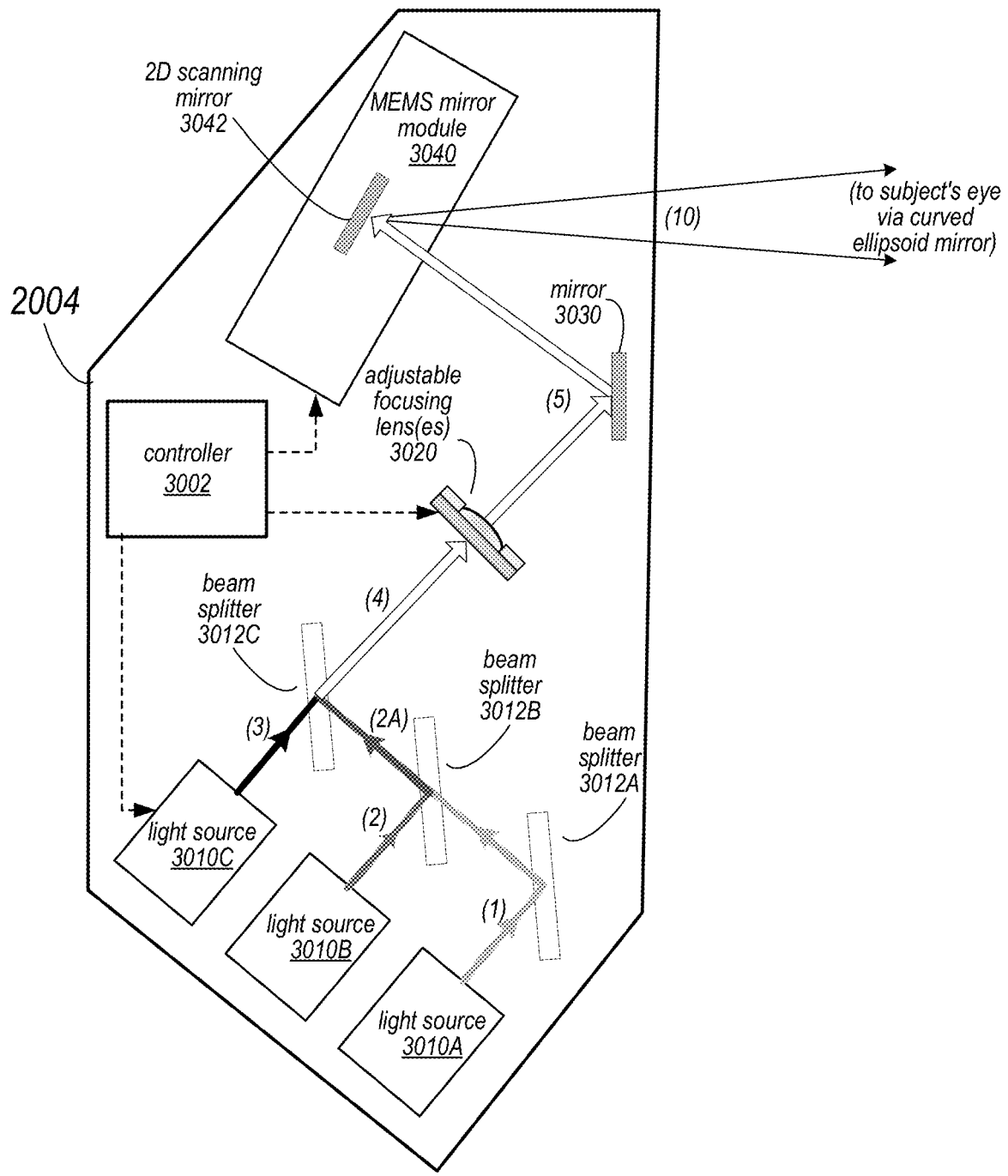
FIG. 9 illustrates a direct retinal projector that includes an adjustable focusing lens, according to some embodiments.

As indicated at 2110 of FIG. 7A, the projector 2004 component of the direct retinal projector system 2000 scans a light field (10) through the second beam splitter 2012B, off the 2D reflecting mirror 2006, and to the curved ellipsoid mirror 2008; the curved ellipsoid mirror 2008 reflects (and focuses) the light field 10 to the subject's eye 2090. An example projector that may be used in embodiments is illustrated in FIG. 9. FIGS. 12 through 20 provide further details of a projector that may be used in embodiments.

As indicated at 2120 of FIG. 7A, the IR light source 2010 emits an IR light beam (20) to the first beam splitter 2012A. As indicated at 2122 of FIG. 7A, the first beam splitter 2012A transmits the IR light beam 20 to the second beam splitter 2012B. As indicated at 2124 of FIG. 7A, the second beam splitter 2012B reflects the IR light beam 10 to the 2D scanning mirror 2006, effectively centering the IR light beam 20 in the light field 10 being scanned out by the projector 2004. As indicated at 2126 of FIG. 7A, the 2D scanning mirror 2006 reflects the IR light beam 20 to the curved ellipsoid mirror 2008; the curved ellipsoid mirror 2008 reflects the IR light beam 20 to the subject's eye 2090. As indicated at 2128 of FIG. 7A, a portion of the IR light beam 20 passes through the subject's pupil 2092 and strikes the subject's retina. The method then continues at 2130 of FIG. 7B.

As indicated at 2130 of FIG. 7B, a portion of the IR light beam 20 that enters the subject's pupil 2092 is reflected off the subject's retina and passes back through the subject's pupil 2092 as a return IR light beam (30). As indicated at 2132 of FIG. 7B, the curved ellipsoid mirror 2008 reflects the return IR light beam 30 to the 2D scanning mirror 2006. As indicated at 2134 of FIG. 7B, the 2D scanning mirror 2006 reflects the return IR light beam 30 to the second beam splitter 2012B. As indicated at 2136 of FIG. 7B, the second beam splitter 2012B reflects the return IR light beam 30 to the first beam splitter 2012A. As indicated at 2138 of FIG. 7B, the first beam splitter 2012A reflects the return IR light beam 30 to the position sensing detector (PSD) 2014.

As indicated at 2140 of FIG. 7B, the PSD 2014 detects the position of the return IR light beam 30 relative to a center position of the PSD 2014 plane. As indicated at 2142 of FIG. 7B, the PSD 2014 signals the controller 2002 according to the detected position of the return IR light beam 30. As indicated at 2150 of FIG. 7B, the controller 2002 adjusts the 2D scanning mirror 2006 to substantially center the return IR light beam 30 in the PSD 2014; in so doing, the 2D scanning mirror 2006 is positioned so that the scanned light field 10 from the projector 2004 enters the subject's pupil 2092.

At 2160 of FIG. 7B, if the session is not done, then the method may return to 2110 of FIG. 7A. Thus, as long as the VR or AR session continues, the direct retinal projector 2000 may continue to operate according to the method of FIGS. 7A and 7B. As the subject's eyes 2090 move relative to the curved ellipsoid mirror 2008, the control loop of the gaze tracking system adjusts the 2D scanning mirror 2006 to center the return IR beam 30 at the PSD 2014, thus effectively insuring that the scanned light field 10 from the projector 2004 that is also reflected off the 2D scanning mirror 2006 enters the subject's pupil 2092.

Beam Focusing System

Embodiments of a beam focusing system for a direct retinal projector system that includes an adjustable focusing element (e.g., an adjustable lens), also referred to as an optical actuator component, are described. In some embodiments, the adjustable focusing element may be an optical microelectromechanical system (MEMS) configured to dynamically change the shape of a flexible optical element to provide adaptive optical functionality for the projector. In some embodiments, the adjustable focusing element may be located on the path of a combined light beam generated by multiple light sources (e.g., lasers) of the projector component of the direct retinal projector system and a scanning mirror component (e.g., a MEMS mirror module) of the projector component.

In some embodiments, a controller component of the direct retinal projector system adjusts focus via the adjustable focusing lens as the light beam generated by the projector component is scanned across the azimuth angle of a curved ellipsoid mirror of the direct retinal projector system that reflects the scanned light beam to the subject's pupil. Since the curved ellipsoid mirror has optical power, the focusing of the scanned beam is adjusted as the beam is scanned across the azimuth angle of the curved ellipsoid mirror. In some embodiments, beam focusing is not changed with the elevation angle during the scan as the direct retinal projector system is rotationally symmetric.

In some embodiments, the beam focus may follow a scanning cycle at the projector frame rate (e.g., 60 Hz, 90 Hz, etc.). In some embodiments, the beam generated by the projector and reflected off the curved ellipsoid mirror is not completely collimated when entering the subject's eye, but is focused to the system hyperfocal distance. In some embodiments, depending on system parameters such as beam diameter and resolution which effect the depth of field, the adjustable focusing lens may provide control over the beam focus to enable focusing at object distances closer than half the hyperfocal distance.

In some embodiments, focusing the beam generated by the projector may compensate for the optical power of the curved ellipsoid mirror, and how this optical power changes across the scan (in azimuth). In some embodiments, the optical power of the curved ellipsoid mirror in elevation does not change. Elevation corresponds to the fast axis scan direction of the projector, and may be difficult to adjust for because of the speed of the fast axis scan.

In some embodiments, focusing the beam generated by the projector may alter and match the beam divergence to the object distance being projected. This may help solve the accommodation convergence mismatch problem, allowing the user to naturally accommodate (focus) the lens of their eye to the object distance corresponding to the apparent depth. An advantage of the direct retinal scanner is to increase the depth of focus; however, it is unlikely that this will be perfect over the depth range 20 cm to infinity. In particular, larger diameter beams (which produce better retinal resolution) may generally have a worse depth of focus than smaller diameter beams (which sacrifice some retinal resolution but provide better depth of focus), meaning that extra compensation from the beam focusing may be needed.

In some embodiments, focusing the beam generated by the projector may be used to deliberately defocus and blur parts of the projected image that the user is not looking at. A possible drawback of the increased depth of focus provided by the direct retinal projector is that the depth of focus may appear unnatural to the user. However, the parts of the image that are in focus or out of focus (blurred) are within the control of the system, and parts of the image can be deliberately blurred using the beam focusing system. This is true across the azimuth scan, being the slow axis (e.g. 90 Hz frame rate). However, the fast axis scan (elevation) may be too fast to compensate for using some focusing technologies.

However, faster focusing technology, for example focusing technology that uses acoustic standing waves in a material that changes refractive index with pressure to alter focus, may be leveraged to provide control over focusing on the elevation (fast axis) scan in some embodiments. In the focusing technology that uses acoustic standing waves in a material that changes refractive index with pressure to alter focus, optical power changes throughout the acoustics wave period, and the beam can be modulated to the correct phase to correspond with a certain optical power. Thus, in some embodiments, focus may be controlled in the fast (elevation) axis as well as in the slow (azimuth) axis.

FIGS. 8A through 11B further illustrate components and methods of operation of an adjustable focusing element in a direct retinal projector system, according to at least some embodiments.

Figure 8A:
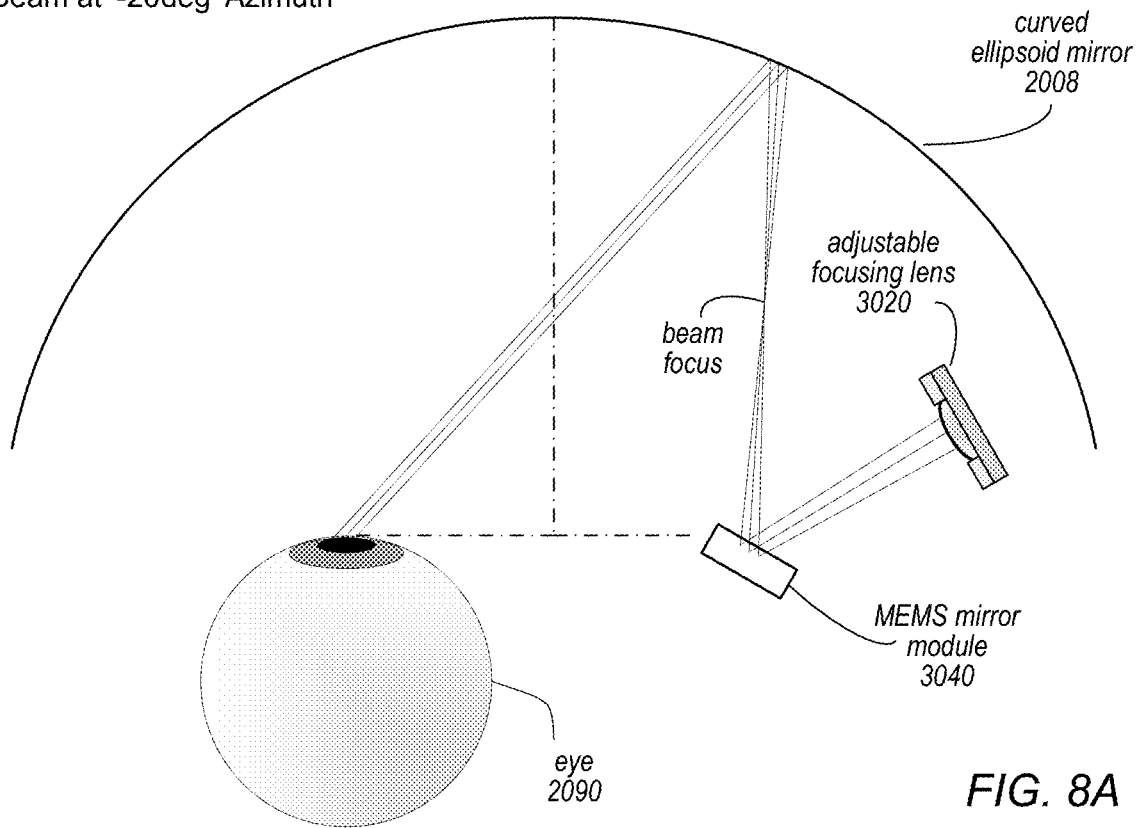
FIGS. 8A through 8C illustrate focusing at different points relative to an azimuth, according to some embodiments.
Figure 8B:
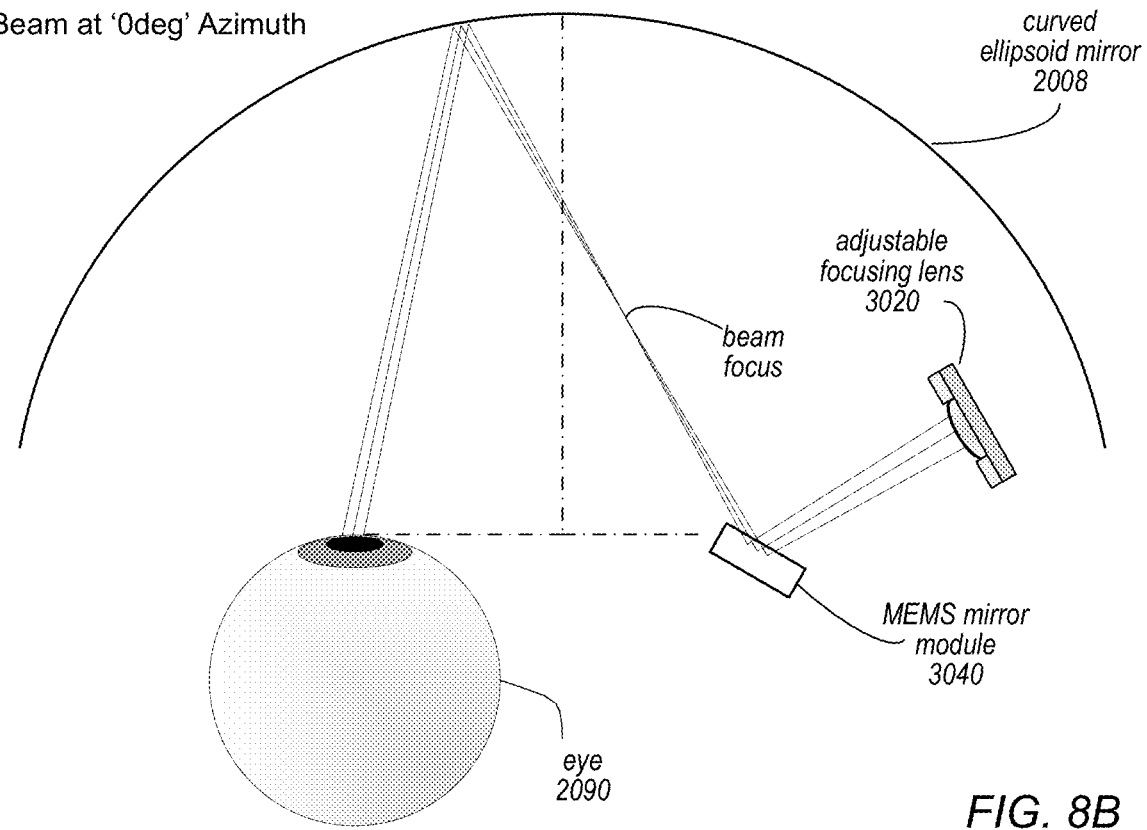
Figure 8C:
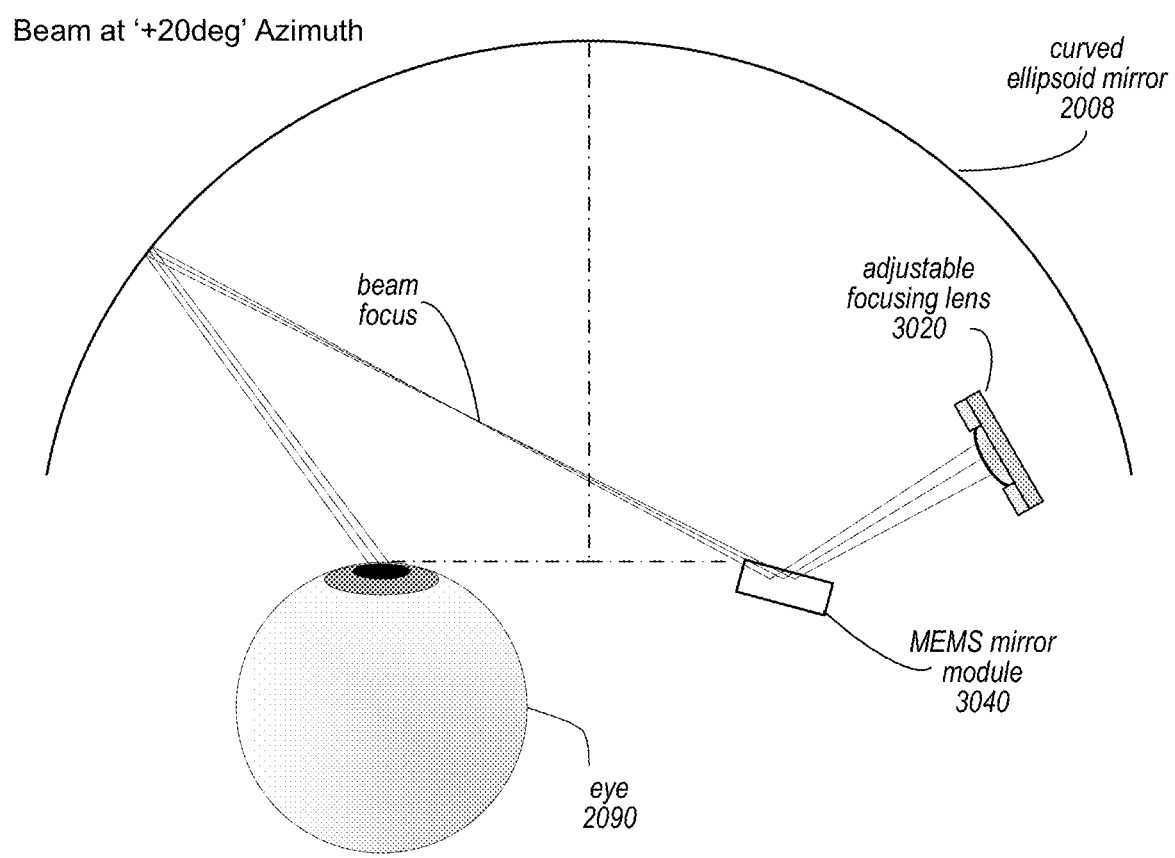

FIGS. 8A through 8C illustrate focusing at different points relative to the azimuth of the curved ellipsoid lens, according to some embodiments. FIG. 8A shows focusing at −20 degrees azimuth, FIG. 8B shows focusing at 0 degrees azimuth, and FIG. 8C shows focusing at +20 degrees azimuth. As shown in FIGS. 8A through 8B, the beam (e.g., generated by RGB lasers in the projector) may be dynamically focused by an adjustable focusing lens 3020 before being scanned to the curved elliptical mirror 2008 by the MEMS mirror module 3040 of the projector. FIGS. 8A through 8C show that, since the curved ellipsoid mirror 2008 has optical power, the focusing of the scanned beam needs to be adjusted as the beam is scanned across the azimuth angle of the curved ellipsoid mirror 2008.

In some embodiments, beam focusing is not changed with the elevation angle as the system is rotationally symmetric. Thus, in some embodiments, the beam focus follows a scanning cycle at the projector frame rate (e.g., 60 Hz, 90 Hz, etc.). In some embodiments, the beam generated by the projector and reflected off the curved ellipsoid mirror is not completely collimated when entering the subject's eye 2090, but is focused to the system hyperfocal distance. In some embodiments, depending on system parameters such as beam diameter and resolution which effect the depth of field, the adjustable focusing lens 3020 may provide control over the beam focus to enable focusing at object distances closer than half the hyperfocal distance.

In some embodiments, assuming the beam is neutrally focused as may be required by the lenses in the projector, adding an adjustable focusing element 3020 with a range of about 10 diopters may be sufficient to cover the range of focusing needed for the range of azimuth angles.

FIG. 9 illustrates a direct retinal projector that includes an adjustable focusing lens, according to some embodiments. The projector 2004 of FIG. 9 may, for example, be used in a direct retinal projector system as shown in FIG. 6. Note that the size and shape of the projector 2004, and the arrangement of the components within the projector 2004, are provided by way of example and are not intended to be limiting. Also note that there may be more or fewer components in projector 2004 than shown.

Figure 11A:
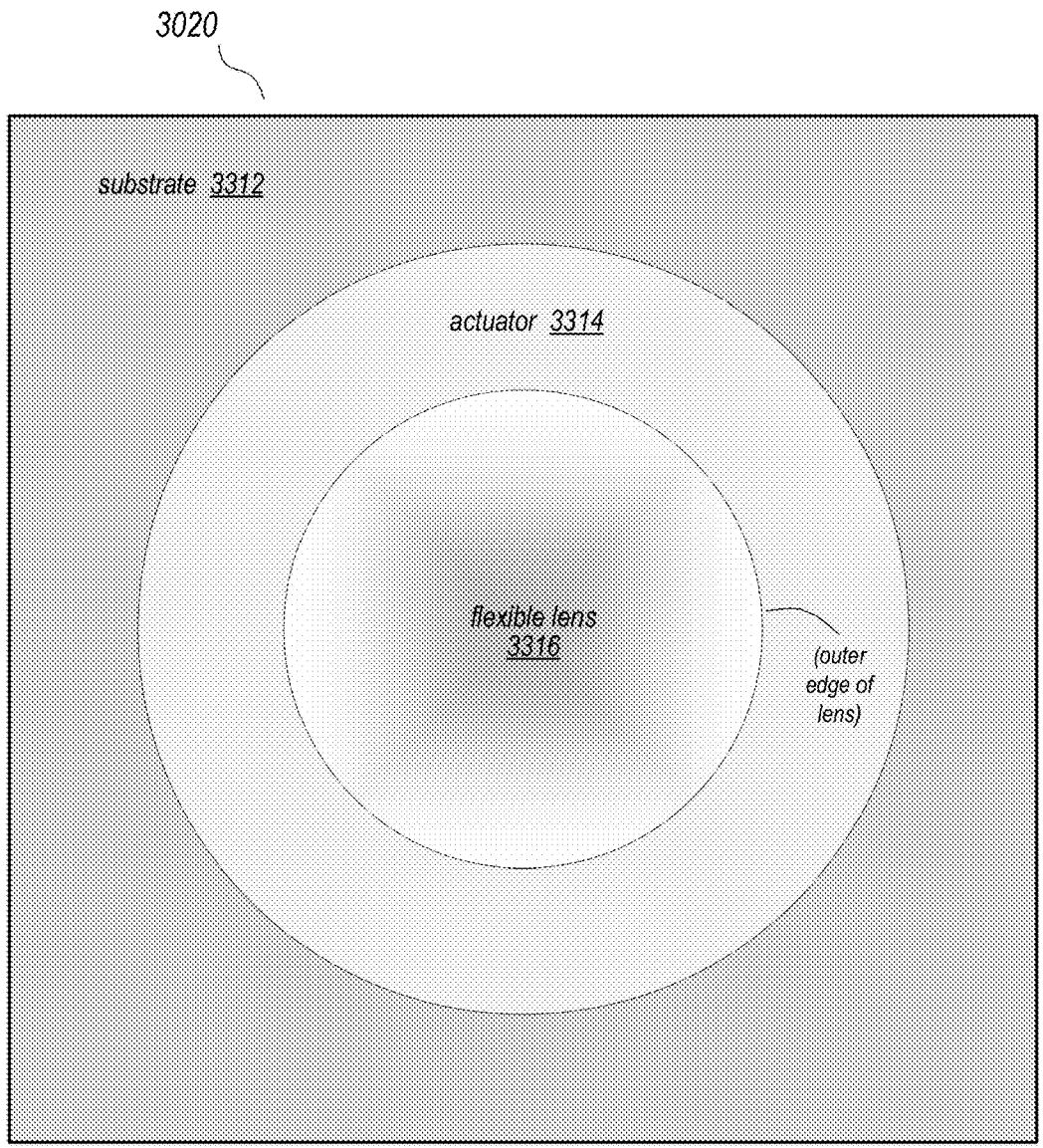
FIGS. 11A and 11B illustrate an adjustable focusing lens, according to some embodiments.

As shown in FIG. 9, in some embodiments, a projector 2004 may include multiple light sources 3010 (e.g., a green laser 3010A, a red laser 3010B, and a blue laser 3010C in an RGB laser component). The projector 2004 may also include beam splitters 3012A-3012C that direct and combine the beams (1), (2), and (3) emitted by the light sources 3010A-3010C to form a single combined beam (4). As shown in FIG. 9, beams 1 and 2 may first be combined by beam splitter 3012B to form beam (2A), and beam (2A) may then be combined with beam (3) by beam splitter 3012C to form beam (4). The projector 2004 may also include an adjustable focusing lens 3020 on the path of combined beam (4) that focuses the beam (4) to form focused beam (5) under direction of a controller 3002, for example a processor or processors internal to or external to the projector 2004. An example adjustable focusing lens that may be used in some embodiments is shown in FIGS. 11A and 111B. While FIG. 9 shows a single adjustable focusing lens 3020, in some embodiments there may be two or more adjustable focusing lenses 3020 arranged in series along the optical path of the combined beam that may be used in combination to adjust focus or other optical properties of the combined beam.

In some embodiments, as shown in FIG. 9, the focused beam (5) may be reflected to the MEMS mirror module 3040 by a mirror 3030 or mirrors. The focused beam (5) may then be scanned to the curved ellipsoid mirror that reflects the scanned beam to the subject's eye. Focusing may be automatically adjusted under direction of the controller 3002 as the beam is scanned across the azimuth of the curved ellipsoid mirror, for example to adjust for curvature and optical power of the curved ellipsoid mirror as the beam is scanned across the azimuth of the curved ellipsoid mirror and/or to focus or defocus regions of an image generated by the scanned light field on the subject's retina.

Figure 10:
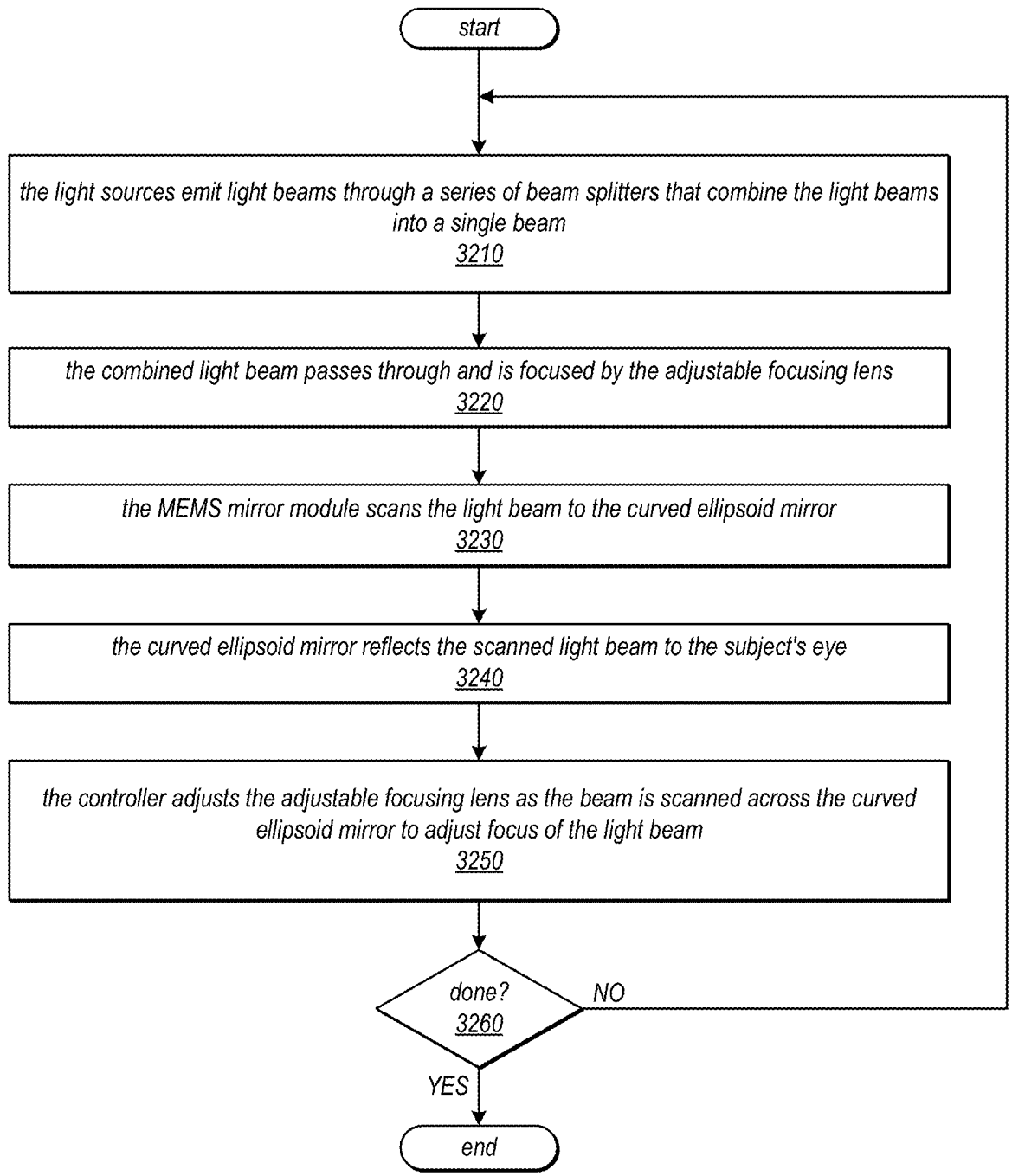
FIG. 10 is a flowchart of a method of operation for an adjustable focusing lens in a direct retinal projector, according to some embodiments.

FIG. 10 is a flowchart of a method of operation for an adjustable focusing lens in a direct retinal projector, according to some embodiments. The method of FIG. 10 may, for example, be performed by the direct retinal projector 2004 as illustrated in FIG. 8.

As indicated at 3210, the light sources 3010 emit light beams (1), (2), and (3) through a series of beam splitters 3012 that combine the light beams into a single beam (4). As indicated at 3220, the combined light beam passes through and is focused by the adjustable focusing lens 3020 to generate a focused beam (5). As indicated at 3230, the MEMS mirror module 3040 scans the light beam (5) to the curved ellipsoid mirror, for example mirror 2008 as shown in FIG. 6. As indicated at 3240, the curved ellipsoid mirror reflects the scanned light beam to the subject's eye.

As indicated at 3250, the controller 3002 adjusts the adjustable focusing lens 3020 as the beam is scanned across the curved ellipsoid mirror to adjust focus of the light beam. In some embodiments, the beam is scanned across the azimuth angle of the ellipsoid mirror, and the adjustable focusing lens is adjusted as the beam is scanned across the azimuth angle to adjust focus of the combined light beam according to the azimuth angle and thus adjust for curvature and optical power of the ellipsoid mirror. In some embodiments, the adjustable focusing lens is instead or also adjusted as the beam is scanned across the ellipsoid mirror to focus portions of an image created by the scanned light field on the subject's retina and to defocus or blur other portions of the image.

At 3260, if the session is not done, then the method may return to 3210. As long as the VR or AR session continues, then the direct retinal projector may continue to operate according to the method of FIG. 10.

In some embodiments, depending on system parameters such as beam diameter and resolution which effect the depth of field, the adjustable focusing lens 3020 may be controlled by the controller 3002 to enable focusing at object distances closer than half the hyperfocal distance.

Figure 11B:
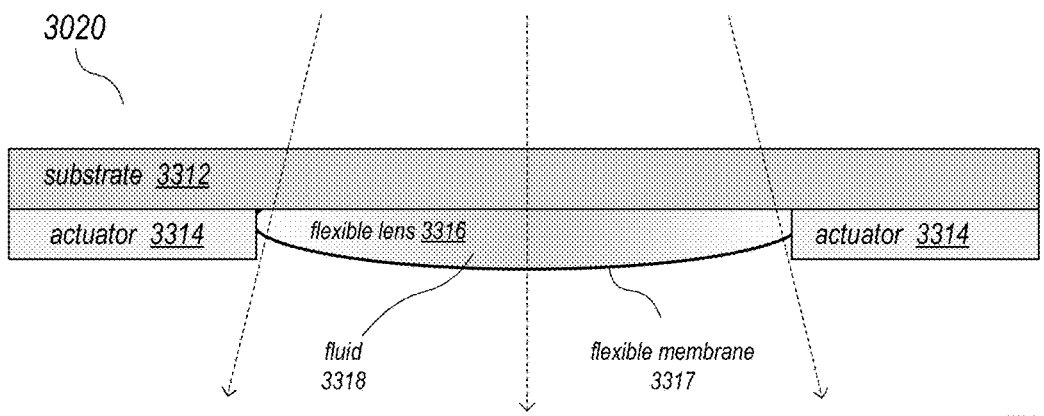

FIGS. 11A and 11B illustrate an example optical actuator 3020 that may be used as an adjustable focusing element for the beam in the projector, according to some embodiments. The optical actuator 3020 of FIGS. 11A and 11B may, for example, be used in a projector 2004 as illustrated in FIGS. 4 and 8. The optical actuator 3020 may include, but is not limited to, a substrate 3312 (e.g., a clear glass or plastic substrate), a flexible optical element 3316 (e.g., a flexible lens), and an actuator 3314 component that is configured to change the shape of the flexible optical element 3316 to provide adaptive optical functionality for the projector 2004. As shown in FIG. 111B, the flexible optical element 3316 may include a flexible membrane 3317 and a fluid 3318 (e.g., optical oil) in one or more cavities between the flexible membrane 617 and the surface of the substrate 3312. For example, to change the shape of the flexible optical element 3316, the actuator 3314 component may add or remove fluid 3318 from the cavity(s) of the flexible optical element 3316. The optical functionality provided by the optical actuator 3020 may include, but is not limited to, adjusting focus of the combined light beam from the light sources 3010 as the beam is scanned across the ellipsoid lens, for example. While FIGS. 11A and 11B show the substrate 3312 as rectangular or square, the substrate 3312 may be other shapes, for example circular.

In some embodiments, the optical actuator component used as an adjustable focusing lens 3020 in the projector 2004 may be an optical microelectromechanical system (MEMS) configured to dynamically change the shape of a flexible optical element to provide adaptive optical functionality for the projector 2004 as shown in FIGS. 11A and 11B. As another example, in some embodiments, the optical actuator component may be an actuator configured to dynamically change optical characteristics of one or more optically adjustable lens elements in a lens system such as liquid-crystal technology lenses, electrowetting technology lenses (referred to as "liquid lenses"), or electrochromic technology lenses to provide adaptive optical functionality for the projector 2004.

In some embodiments, a focusing technology that uses acoustic standing waves in a material that changes refractive index with pressure to alter focus may be used as the optical actuator component. In this focusing technology, the optical power changes throughout the acoustics wave period, and the light source (e.g., laser(s)) of the projector can be modulated to the correct phase to correspond with a certain optical power.

Example Direct Retinal Projection Virtual Reality Devices

Embodiments of a virtual reality device (e.g. headset) are described that provide direct retinal projection and that may implement or incorporate embodiments of the scan tracking system, adjustable focus element, and other methods and apparatus for direct retinal projector systems as described above. In some embodiments, the direct retinal projection technology may include a light emitting device that may include one or more light emitting elements (e.g., lasers, LEDs, etc.) configured to generate one or more collimated light beams. A processor connected to the light emitting device may be configured to selectively activate one or more groups of the light emitting elements. A scanning mirror may include one or more microelectromechanical systems (MEMS) mirrors. Each MEMS mirror of the scanning mirror may be configured to dynamically tilt in at least one of two orthogonal degrees of freedom in response to instructions received from the processor. Each MEMS mirror may also be configured to raster scan the light beams over multiple angles corresponding to a field of view of an image. A curved mirror may include curves in two orthogonal directions configured to reflect the collimated light beams from the scanning mirror into a subject's eye in proximity to the curved mirror.

In some embodiments, a VR/AR system may include light emitting devices that each include one or more light emitting elements, for example lasers (e.g., vertical cavity surface-emitting lasers (VCSELs)), and respective focusing and/or collimation elements (e.g., dynamically adjustable focusing lenses). While embodiments are generally described as using lasers such as VCSELs, other types of light emitting elements, for example light emitting diodes (LEDs), may be used in some embodiments. The VCSELs may be grouped into laser modules, for example with each group or module including a red VCSEL, a blue VCSEL, and a green VCSEL. In some embodiments, each of the collimated light beams may be configured to include a diameter of less than sixty (60) micrometers. In some embodiments, the curved mirror may be an ellipsoid mirror. In some embodiments, the curved mirror may include a partially-reflective layer configured to transmit at least a portion of external light through the curved mirror to the eye, where the external light is incident on an opposite surface of the curved mirror relative to the collimated light beams incident on the internal surface of the curved mirror. In some embodiments, the system may include one or more gaze tracking modules configured to monitor the orientation of one or more eyes and transmit the eye orientation data to the processor, where the processor is configured to dynamically select one or more active portions of the light emitting device and the scanning mirror based at least on the eye orientation data and a respective field of view corresponding to the one or more active portions of the light emitting device and the scanning mirror. In addition to compensating for the subject's eye orientation (e.g., where the subject is looking), the gaze tracking technology may compensate for differences in spacing between different subject's eyes.

In some embodiments, a method for a VR/AR device may include generating, by a light emitting device that may include one or more light emitting elements (e.g., laser modules), one or more collimated light beams. The method may also include selectively activating, by a processor connected to the light emitting device, one or more groups of the light emitting elements. In some embodiments, the method may include dynamically tilting, by the processor, each of one or more microelectromechanical systems (MEMS) mirrors of a scanning mirror in at least one of two orthogonal degrees of freedom. Additionally, the method may include raster scanning, by the scanning mirror, the collimated light beams over multiple angles corresponding to a field of view of an image. Furthermore, the method may include reflecting, by a curved (e.g., ellipsoid) mirror that may include curves in two orthogonal directions, the collimated light beams from the scanning mirror into a subject's eye in proximity to the curved mirror. In some embodiments, the method may include generating, by the collimated light beams, a virtual reality view that may include the image. In some embodiments, the raster scanning may include generating, by the collimated light beams and over a second set of multiple angles, a second field of view in response to a determination, by the processor and based on the eye orientation data, that the eye has moved to a second orientation. In some embodiments, the method may include generating, by the collimated light beams, an augmented reality view that may include virtual images generated by the collimated light beams combined with a real-world view provided by external light that passes through the curved mirror.

In some embodiments, a VR/AR device may include a frame configured to be worn on the head of a user (also referred to as a subject). In some embodiments, the device may include first and second light emitting devices connected to the frame, where the first and second light emitting devices may include respective first and second sets of light emitting elements configured to generate respective first and second sets of collimated light beams. A processor connected to the first and second light emitting devices may be configured to selectively activate one or more groups of the respective ones of the first and second sets of light emitting elements. First and second scanning mirrors connected to the frame may include respective sets of one or more microelectromechanical systems (MEMS) mirrors. Each MEMS mirror of the first and second scanning mirrors may be configured to dynamically tilt in at least one of two orthogonal degrees of freedom in response to instructions received from the processor. Each MEMS mirror of the first and second scanning mirrors may also be configured to raster scan the light beams over multiple angles corresponding to a field of view of an image. First and second curved (e.g., ellipsoid) mirrors connected to the frame may each include curves in two orthogonal directions. The first curved mirror may be configured to reflect the first set of collimated light beams from the first scanning mirror into a first eye in proximity to the first curved mirror. The second curved mirror may be configured to reflect the second set of collimated light beams from the second scanning mirror into a second eye in proximity to the second curved mirror.

Direct Retinal Projection Virtual Reality Headset Details

Embodiments of a virtual reality device (e.g., headset) may implement direct retinal projection as described herein to, for example, solve problems with respect to accommodation-convergence mismatches when generating VR and/or AR image(s) by scanning narrow collimated beams of light directly to the retinas of a subject's eyes. In various embodiments, the narrow collimated beams of light may be produced by scanning one or more light sources (e.g., red, green, blue (RGB) lasers) into the subject's eye(s), thereby producing a light field corresponding to the VR and/or AR image(s). In some embodiments, a small beam diameter (e.g., a beam diameter smaller than the pupil of the subject's eye) may enable the system to produce a larger depth of focus and reduce the impact of eye accommodation. For example, the use of parallel beams having small beam diameters may reduce accommodation-convergence mismatch and thus help correct eye problems. In some embodiments, the focus of one or more light beams may be adjusted through a slow axis scan, thereby maintaining beam collimation and/or divergence.

In some embodiments, a VR and/or AR headset system may reduce and/or eliminate accommodation-convergence mismatch problems by scanning narrow collimated beams of light to generate a light field at the subject's eyes. In some embodiments, an F-number calculation for such a system may be described as follows. If a human eye has a focal length of 17 mm at infinity and a focal length of 15.7 mm at a 200 mm focus, then a hyperfocal distance (h) may be approximately equal to 1500 mm. This may ensure an optimal focus over the depth of field of 750 mm to infinity. Assuming a visual acuity of approximately 1 arc minute, this corresponds to a notional "pixel" size of 5 micrometers (μm) (i.e., p), and thus the F-number would be defined by the equation: F-number=$f^2$/(h*p)=38.5, which would result in a required aperture of 440 micrometers (μm). Therefore, a beam diameter of 440 μm entering a subject's eye may provide visual acuity for object distances from 750 mm to infinity, regardless of how the internal lens of the subject's eye is accommodated. The angle of a light beam entering the subject's eye is an important factor in determining the placement of the light with respect to the image seen by the subject's eye, while the position of the light beam with respect to the pupil itself may not be an important factor. Such a system could thus be configured to provide VR and/or AR images to the eyes of the subject while maintaining the subject's comfort. An additional benefit of such a system is that the system may be configurable to adapt to and correct a subject's existing eye problems (e.g., long-sightedness, short-sightedness, or a general reduced ability for accommodation), while still allowing sharp, high-resolution images to be received on the subject's retina.

In some embodiments, a laser module (e.g., a laser module suitable for use in a projector system) may be utilized in a VR/AR device (e.g., headset system). In some embodiments, a laser module may include three separate lasers with different colors, such as red, green, and blue. While embodiments are generally described as using lasers (e.g., VCSELs), other types of light emitting elements, for example light emitting diodes (LEDs), may be used in some embodiments. Beam splitters and reflectors may also be used to superpose the beams emitted by the lasers to a single RGB beam, which may then be scanned using a scanning mirror. In some embodiments, the scanning mirror may be a two-dimensional (2D) microelectromechanical (MEMS) mirror. In some embodiments, the scanning mirror may be a three-dimensional (3D) MEMS mirror. In some embodiments, a single laser module and a single adjustable scanning mirror may be used (with one set for each eye). In some embodiments, an array of MEMS mirrors may be used to raster scan multiple light beams from an array of laser modules (with two sets of laser/mirror arrays, one for each eye). In some embodiments, the scanning mirror may be placed at or close to one of the foci of a curved mirror, such as an ellipsoid mirror, and the pupil of the subject's eye may be positioned at or close to the other focus of the curved mirror. In such a system, the scanning mirror may be scanned to direct light from the laser modules into the subject's eye and thereby generate a light field corresponding to one or more VR images or AR images. In some embodiments, during a raster scan each laser may be appropriately modulated based at least in part on the desired intensity and color of each location in the projected image.

In some embodiments, a VR headset may continue to focus a light field into the eye of a subject across multiple potential pupil positions. If the subject's pupil moves with respect to the azimuth (i.e., horizontal angle), the subject's pupil may no longer be at a focus of the ellipsoid mirror, and the rays corresponding to the light field may no longer focus to a point. However, so long as the beams converge sufficiently to enter the subject's pupil, the collimated light beams may be correctly focused onto the retina of the subject's eye. As stated above, parallel beams of light entering the subject's pupil land on the retina at the same place, and consequently the position, to the first order, of the beam within the subject's pupil may not be relevant to the focus of the collimated light beams on the subject's retina.

In some embodiments, a laser aperture of approximately 2 millimeters (mm) to 3 mm may be utilized. At the diffraction limit, such a laser may be capable of an angular resolution at the subject's eye of approximately 3 arc minutes for a 2 mm aperture and 2 arc minutes for a 3 mm aperture. For reference, 20/20 vision roughly corresponds to 1 arc minute. Such a laser may also be capable of a hyperfocal distance of 1 meter (m) for a 2 mm aperture and 2.5 m for a 3 mm aperture. Therefore, for a 2 mm aperture, the image at the subject's eye may be in focus on the subject's retina if accommodated from 0.5 m to infinity. Similarly, for a 3 mm aperture, the image at the subject's eye may be in focus on the subject's retina if accommodated from 1.3 m to infinity.

In some embodiments, diffraction limit calculations may be based on the far-field estimate of the beam parameter product (BPP). BPP corresponds to $(\Delta x)*\Delta\alpha/4 \geq \lambda/\pi$, where $\Delta x$ is the beam width; $\Delta\alpha$ is the beam divergence angle; $\lambda$ is the light wavelength; and $\lambda/\pi$ is the diffraction limit (0.175 mm mrad for 550 nm light). The Fresnel number $(N)=(\Delta x)^2/(\lambda*L)$ indicates whether the beam is in the near field or far field, where L is the distance from the aperture to the point of interest. In some embodiments, L may be approximately 127 mm, although this is just an example and should not be considered to be limiting. As example values of N, for a 2 mm aperture N may be approximately 14, and for a 3 mm aperture N may be approximately 32. Values of N<0.2 may correspond to a far-field where the beam may be assumed to be Gaussian. If N>100, diffraction effects may be ignored.

In the above discussion of the range of N, the Fresnel diffraction region and the near field are assumed. Thus, the diffraction limit equations used in the discussion are not correct, as beam divergence (Aa) is not defined for the near field. In practice, however, the beam performance may be better than predicted by the far field numbers.

The techniques described herein for a VR/AR device may be further illustrated in terms of an example VR/AR headset system that employs them. As noted above, these techniques may be implemented in any type of display device, apparatus, optical projection system, or computing system that includes the capability to process and display image and/or video data.

Figure 12:
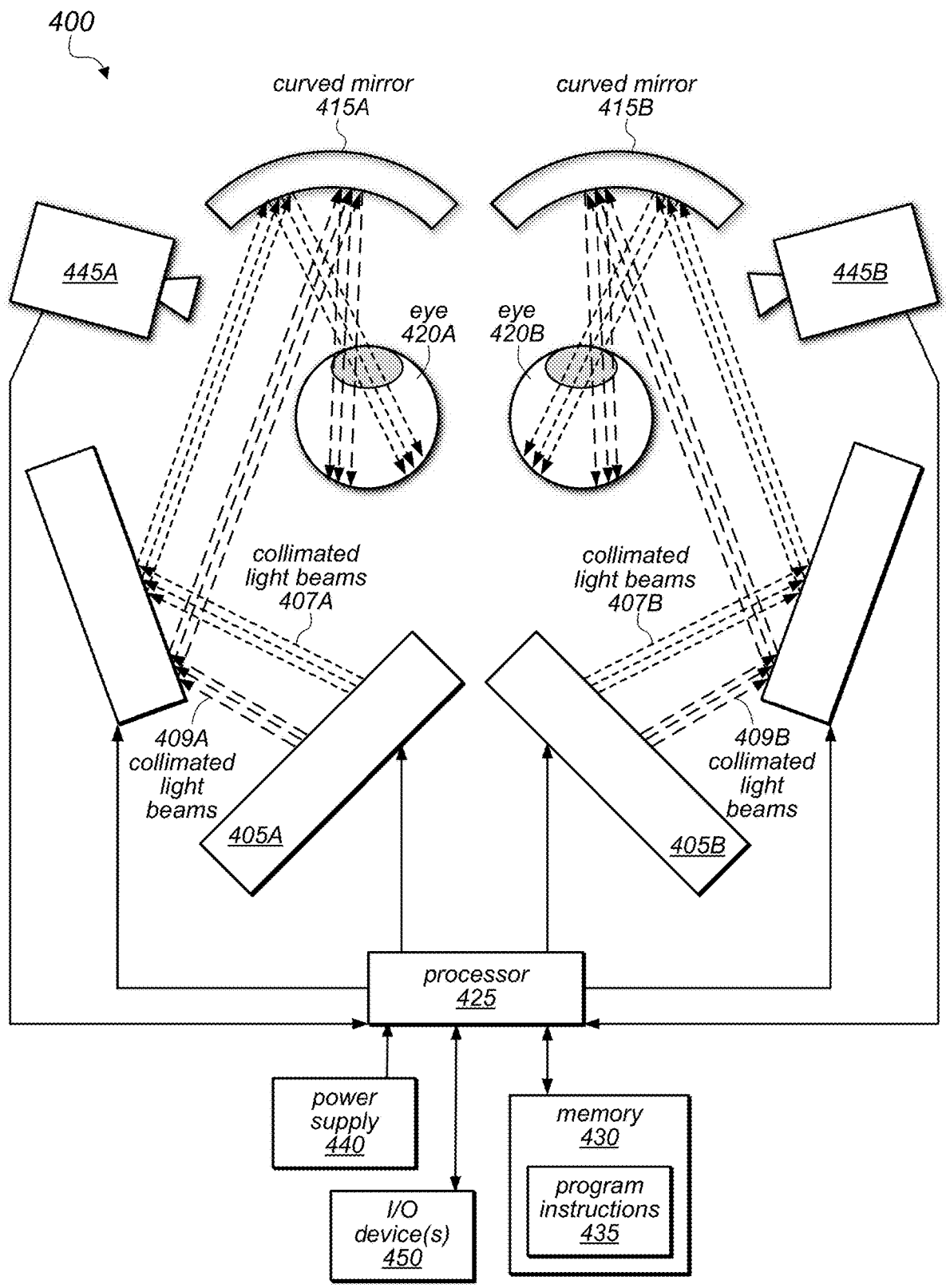
FIG. 12 is logical block diagram of a virtual reality (VR) and/or augmented reality (AR) device, according to some embodiments.

One example of a system that is configured to implement any or all of the techniques described herein is illustrated in FIG. 12. For example, system 400 illustrated in FIG. 12 may be configured as a virtual reality headset, according to some embodiments. In the illustrated embodiment, system 400 includes light emitting devices 405A-B coupled to processor 425, scanning mirrors (e.g., MEMS mirror arrays) 410A-B coupled to processor 425, one or more gaze tracking module(s) 445A-B coupled to processor 425, a memory 430, a power supply 440, and one or more input/output (I/O) device(s) 450. As depicted, system 400 also includes a left curved mirror 415A and a right curved mirror 415B, which are configured to reflect collimated light beams 407A into a subject's left eye 420A and to reflect collimated light beams 407B into a subject's right eye 420B, respectively.

In this example, light emitting devices 405A-B may include any type of light emitting elements suitable for emitting light beams, such as vertical cavity surface emitting lasers (VCSELs), light emitting diodes (LEDs), or other devices. In some embodiments, light emitting devices 405A-B may be configured to generate and/or modulate collimated light beams 407A and 407B, respectively. Furthermore, light emitting devices 405A-B may be positioned (e.g., on a frame holding the various elements of system 400), such that light emitting devices 405A-B are oriented to emit collimated light beams at least in the direction(s) of scanning mirrors 410A and 410B, respectively. Various examples of light emitting devices 405A-B are illustrated in FIGS. 13, 15, 16, and 19, which are discussed in detail below. An example of a frame for system 400 is illustrated in FIG. 17, which is discussed in detail below.

In some embodiments, scanning mirrors (e.g., MEMS mirror arrays) 410A-B may be positioned and/or oriented (e.g., on a frame holding the elements of system 400) such that scanning mirrors 410A-B are located at or close to focal points of curved mirrors 415A and 415B, respectively. In some embodiments, processor 425 may selectively control and/or adjust the positions of one or more movable mirror elements in each of scanning mirrors 410A-B in order to generate a raster scan of collimated light beams 407A-B, respectively, into a light field that may be reflected from curved mirrors 415A-B, respectively, and into the subject's eyes 420A-B, respectively. In some embodiments, the subject's eyes 420A-B may be positioned at or near to focal points of curved mirrors 415A-B, respectively. Various examples of scanning mirrors 410A-B and curved mirrors 415A-B are illustrated in FIGS. 5, 6, 10, 12A, and 12B, 13, 14, 18, 20A, and 20B, which are discussed in detail below.

Figure 13:
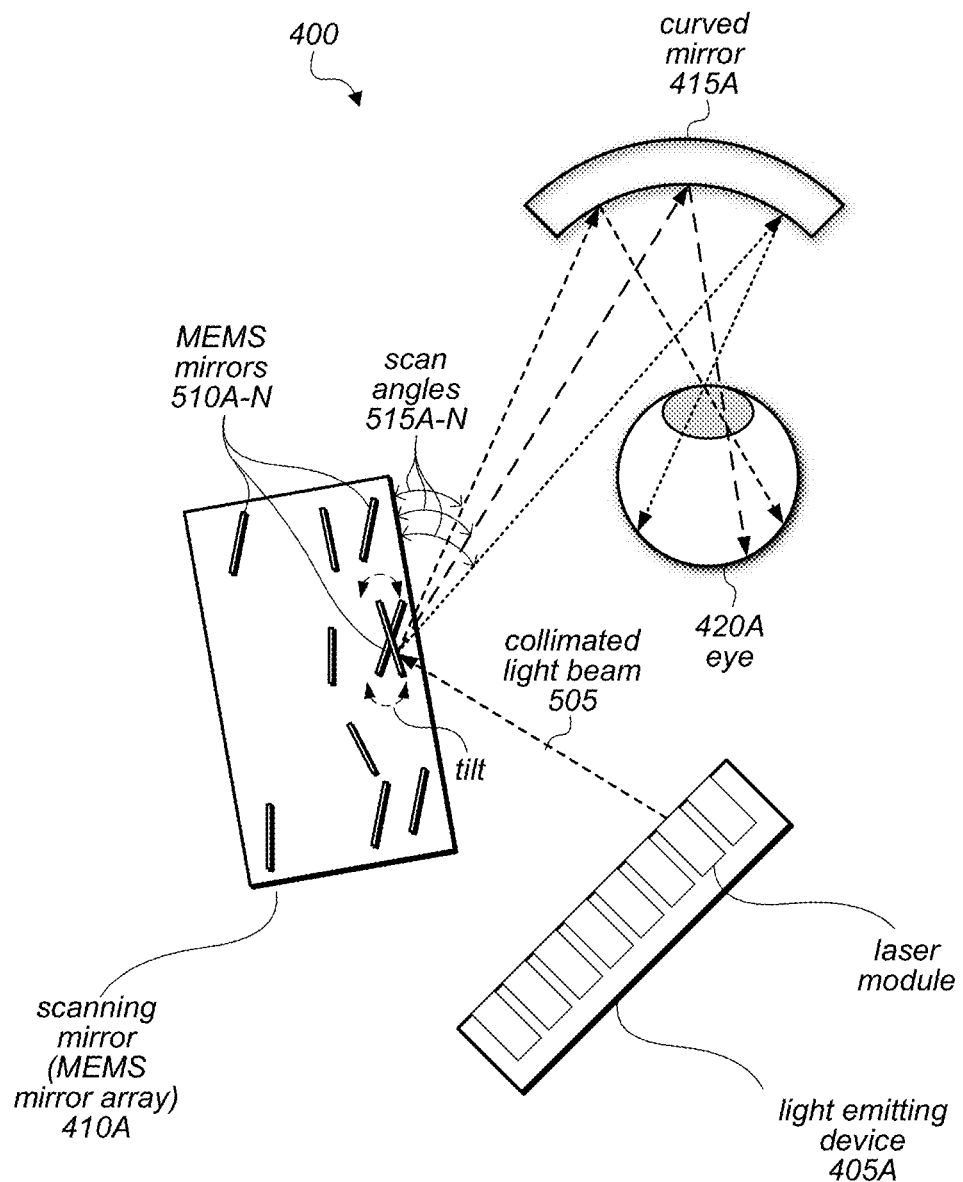
FIG. 13 is a logical block diagram of a raster scan generated using an array of MEMS mirrors, according to some embodiments.

In some embodiments, a light emitting device 405 may include a single laser group or module that includes a red, a green, and a blue laser, and a scanning mirror 410 may include a single MEMS mirror that is used to raster scan a collimated light beam from the light emitting device 405 to generate an image at the subject's respective eye 420. In some embodiments, as illustrated in FIG. 13, a light emitting device 405 may include an array of two or more laser groups or modules, and a scanning mirror 410 may include an array of two or more MEMS mirrors that are used to raster scan multiple collimated light beams from the array of laser modules to generate images at the subject's respective eye 420.

While using the system 400, a subject may move their eyes. In addition, different subject's eyes may be differently spaced. In some embodiments, to avoid distortion in a projected image due to eye orientation and/or spacing, gaze tracking technology may be used to dynamically adjust the virtual image projected by the system 400 according to the subject's current eye orientation and the spacing between the subject's eyes. Gaze tracking module(s) 445A-B may monitor the orientation of the subject's eyes 420A-B and transmit the eye orientation data to the processor 425. The processor 425 may dynamically select one or more active portions of the light emitting device 405 (e.g., one or more laser groups) and of the scanning mirror (e.g., one or more MEMS mirrors) according to the eye orientation data and a respective field of view corresponding to the one or more active portions of the light emitting device and the scanning mirror. In addition to compensating for the subject's eye orientation (e.g., where the subject is looking), the gaze tracking technology may compensate for differences in spacing between different subject's eyes.

In different embodiments, system 400 may include any of various types of devices including, but not limited to: a personal computer system; a laptop computer; a notebook, tablet, slate, or netbook computer; a handheld computer; a mobile device, such as a mobile phone, tablet device, or music player; a video game console; a handheld video game device; or in general any type of computing or electronic device that includes the functionality of generating images for a virtual reality and/or augmented reality system. In some embodiments, system 400 or processor 425 may include more or fewer elements than those shown in FIG. 12.

In various embodiments, processor 425 may be a uniprocessor system including one processor, or a multiprocessor system including several processors (e.g., two, four, eight, or another suitable number). Processor 425 may include central processing units (CPUs) configured to implement any suitable instruction set architecture, and may be configured to execute instructions defined in that instruction set architecture. For example, in various embodiments processor 425 may be general-purpose or embedded processors implementing any of a variety of instruction set architectures (ISAs), such as the x86, PowerPC, SPARC, RISC, or MIPS ISAs, or any other suitable ISA. In multiprocessor systems, each of processors 425 may commonly, but not necessarily, implement the same ISA. Processor 425 may employ any microarchitecture, including scalar, superscalar, pipelined, superpipelined, out of order, in order, speculative, non-speculative, etc., or combinations thereof. Processor 425 may include circuitry to implement microcoding techniques. Processor 425 may include one or more processing cores each configured to execute instructions. Processor 425 may include one or more levels of caches, which may employ any size and any configuration (set associative, direct mapped, etc.).

In the example system 400 illustrated in FIG. 12, memory 430 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 400 in a chip-on-chip configuration, a package-on-package configuration, or a multi-chip module configuration. In some embodiments, system memory 430 may store pixel data or other image data or statistics in various formats. Similarly, while the example system 400 illustrated in FIG. 12 includes persistent storage for non-volatile storage of image data or other data used in the system, in other embodiments, the system may include other types of non-volatile memory (e.g. read-only memory (ROM)) for those purposes. In some embodiments, memory 430 may include data, such as a program instructions 435 and/or one or more representative maps used by an image signal processor to identify, process, and thereby generate collimated light beams configured to produce a light field corresponding to VR and/or AR image data. One embodiment of an implementation of program instructions 435 is illustrated in more detail in FIG. 19 and described below.

Processor 425 may include a graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. The amount of hardware and software implementation may vary from embodiment to embodiment.

I/O devices 450 may include any desired circuitry, depending on the type of system 400. For example, in some embodiments, system 400 may be configured to interface with a mobile computing device (e.g. personal digital assistant (PDA), tablet device, smart phone, etc.), and the I/O devices 450 may include devices for various types of wireless communication, such as WiFi, Bluetooth, cellular, global positioning system, etc. In some embodiments, I/O devices 450 may also include additional storage, including RAM storage, solid state storage, or disk storage. In some embodiments, I/O devices 450 may include user interface devices such as additional display devices, including touch display screens or multi-touch display screens, power buttons, input buttons, control keys, keyboards, keypads, touchpads, scanning devices, voice or optical recognition devices, microphones, speakers, scanners, printing devices, or any other devices suitable for entering or accessing data by or within system 400.

In some embodiments, processor 425 may include an image signal processor (ISP), which may include dedicated hardware that may facilitate the performance of various stages of an image processing pipeline. In some embodiments, processor 425 and/or an ISP may be configured to receive image data from an external source and/or from one or more data files stored in memory 430 and to process the data into a form that is usable by other components of system 400 (including light emitting devices 405A-B, scanning mirrors 410A-B, gaze tracking modules 445A-B, program instructions 435, and/or I/O devices 450). In some embodiments, processor 425 and/or an ISP may be configured to perform various image procession and manipulation operations including one or more of, but not limited to, image translation operations, horizontal and vertical scaling, non-uniformity correction, filtering, non-uniformity reduction, color space conversion or other non-warping image editing operations, or image stabilization transformations.

Those skilled in the art will appreciate that system 400 is merely illustrative and is not intended to limit the scope of embodiments. For example, system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions 435 stored in memory 430 may be executed by processor 425 to provide various functions of system 400.

In some embodiments, various functions may be performed by software components executing in memory on another device and communicating with the illustrated system via inter-computer communication. Some or all of these software components or any data structures described herein may be stored (e.g., as instructions or structured data) in system memory 430, in persistent storage, or may be stored on a non-transitory computer-readable medium or a portable article to be read by an appropriate drive connected to I/O device(s) 450. In some embodiments, instructions stored on a computer-accessible medium separate from system 400 may be transmitted to system 400 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 20A:
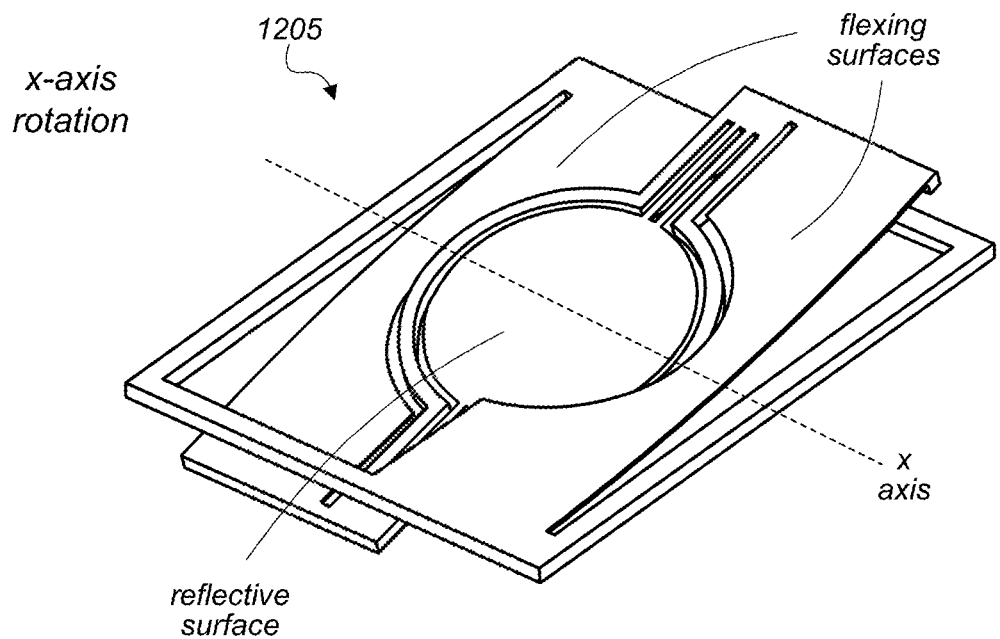
FIGS. 20A and 20B illustrate a dynamically adjustable MEMS mirror that may be used in a VR/AR device, according to some embodiments.
Figure 20B:
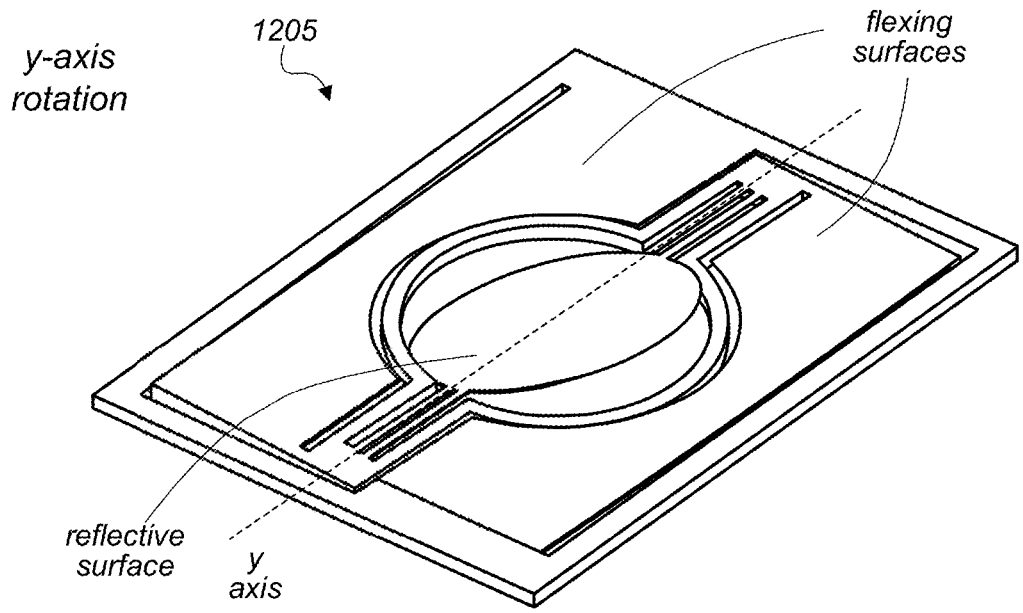

FIG. 13 is an example of a raster scan using an array of MEMS mirrors, according to some embodiments. In some embodiments, MEMS mirrors 510A-N may be configured to tilt according to commands received from processor 425, thereby selectively reflecting collimated light beams across multiple scan angles 515A-N directed towards curved mirror 415A and ultimately into the subject's eye 420A. In some embodiments, each MEMS mirror 510 may be configured to tilt in at least two directions, and the two directions may be orthogonal (e.g., an x-axis and a y-axis). Examples of MEMS mirror 510 tilt configurations are depicted in FIGS. 20A and 20B, which are described in detail below.

Figure 14:
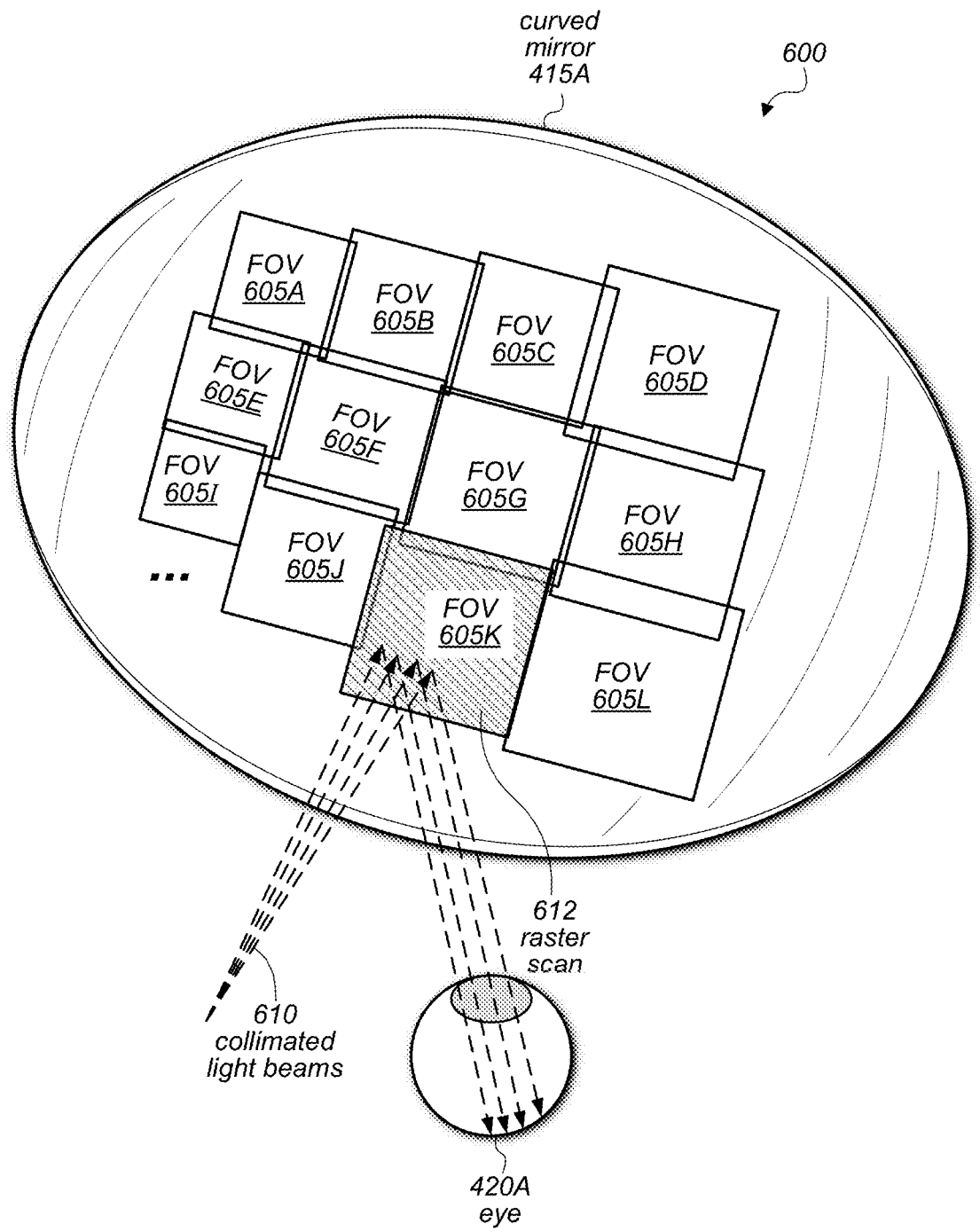
FIG. 14 is a logical block diagram of multiple fields of view, according to some embodiments.

FIG. 14 is an example of multiple fields of view, according to some embodiments. In some embodiments, system 600 may generate collimated light beams 610 that may be raster scanned by a scanning mirror (e.g., a MEMS mirror array as illustrated in FIG. 13) to produce a field of view (FOV), such as FOV 605K of system 600. By selectively modulating one or more light emitting elements (e.g., one or more groupings of RGB lasers) of a respective light emitting device 405, and/or by selectively tilting one or more adjustable mirror elements (e.g., MEMS mirrors) of a respective scanning mirror 410, processor 425 may effectively raster scan collimated light beams 610 across a given FOV, and the FOV may be reflected by curved mirror 415A into a respective eye 420A of the subject. Different MEMS mirror positions in scanning mirrors 410A-B and/or the selective activation of different groups of lasers of the light emitting devices 405A-B may thus accommodate different eye swivel angles as detected by a gaze tracking module 445.

Figure 15:
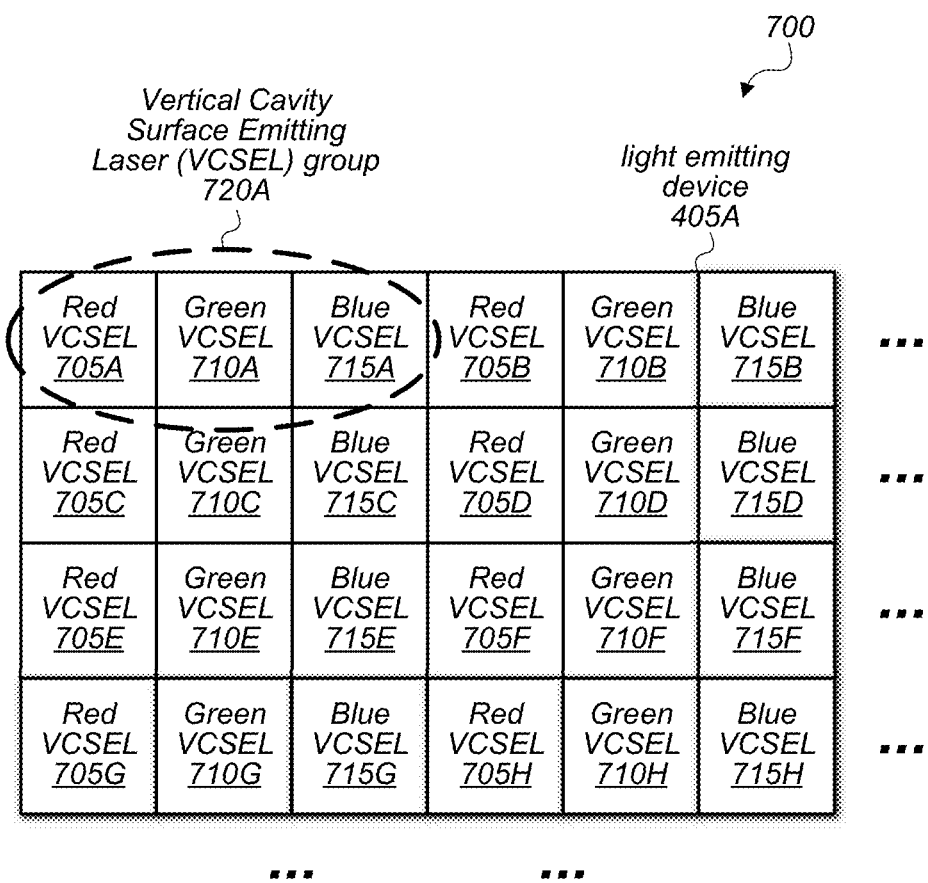
FIG. 15 is a logical block diagram of a configuration of a light emitting device, according to some embodiments.

FIG. 15 depicts an example configuration of a light emitting device, according to some embodiments. As illustrated, system 700 may include light emitting device 405A of FIG. 12. In some embodiments, light emitting device 405A may include multiple VCSEL groups, such as VCSEL group 720A. In some embodiments, each VCSEL group may include multiple colors of lasers (e.g., RGB) usable to generate light corresponding to a pixel pattern of an image. As shown, VCSEL group 720A includes an RGB color pattern having a red VCSEL 705A, a green VSCEL 710A, and a blue VCSEL 715A. In various embodiments, light emitting device 405A may include multiple respective VCSEL groups each configured to represent different pixels of an image and/or different fields of view of a light field. While embodiments are generally described as using VCSELs, other types of light emitting elements, for example light emitting diodes (LEDs), may be used in some embodiments.

Figure 16:
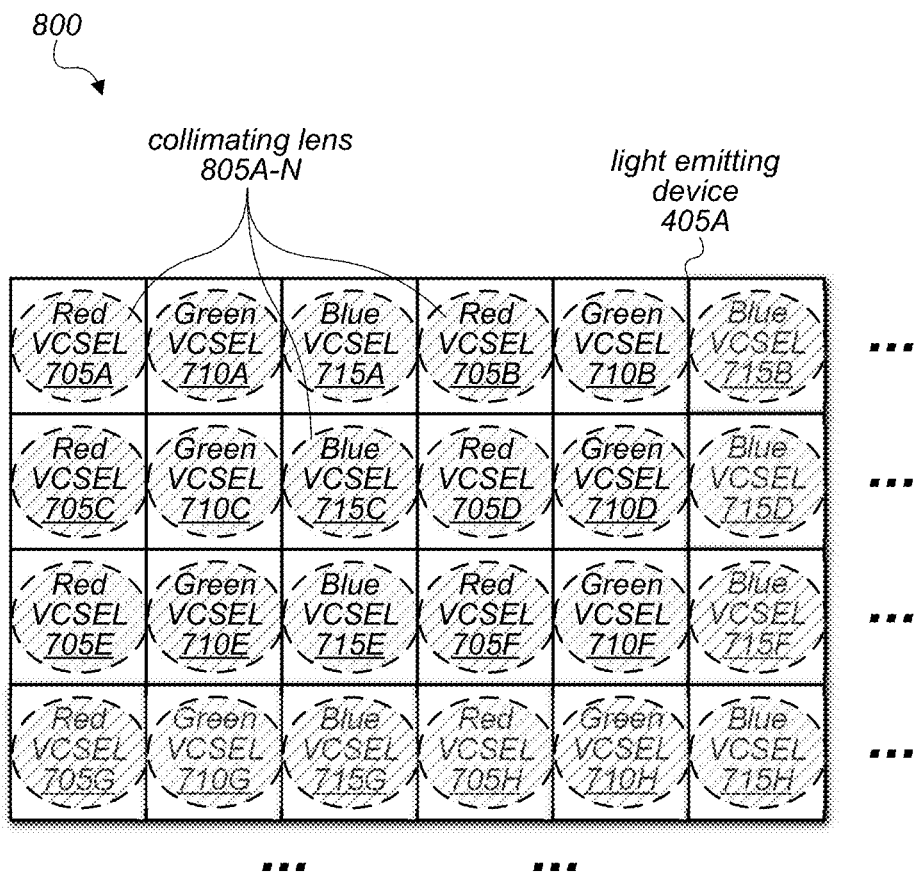
FIG. 16 is a logical block diagram of light source focusing and/or collimating lenses, according to some embodiments.

FIG. 16 illustrates an example of light source focusing and/or collimating lenses, according to some embodiments. As shown, system 800 may include a light emitting device, such as light emitting device 405A of FIG. 12, that includes one or more groups of VCSELs, with one or more collimating lenses 805A-N positioned at or near the output of the VCSELs. In various embodiments, one or more focusing lenses may correspond to one or more respective VCSELs. In some embodiments, one or more apertures may be positioned near the output of the VCSELs to focus and/or collimate the light beams.

FIG. 17 depicts an example of a system 900 including a frame 905, according to some embodiments. As illustrated, frame 905 may be configured to hold various elements of a VR/AR device, such as the elements of system 400 of FIG. 12. In various embodiments, frame 905 may be a glasses frame, a goggles frame, a helmet, or the like, configured to be worn on or over a subject 990's head so as to position the curved mirrors 415A and 415B in front of the subject 990's left and right eyes, respectively.

Figure 18:
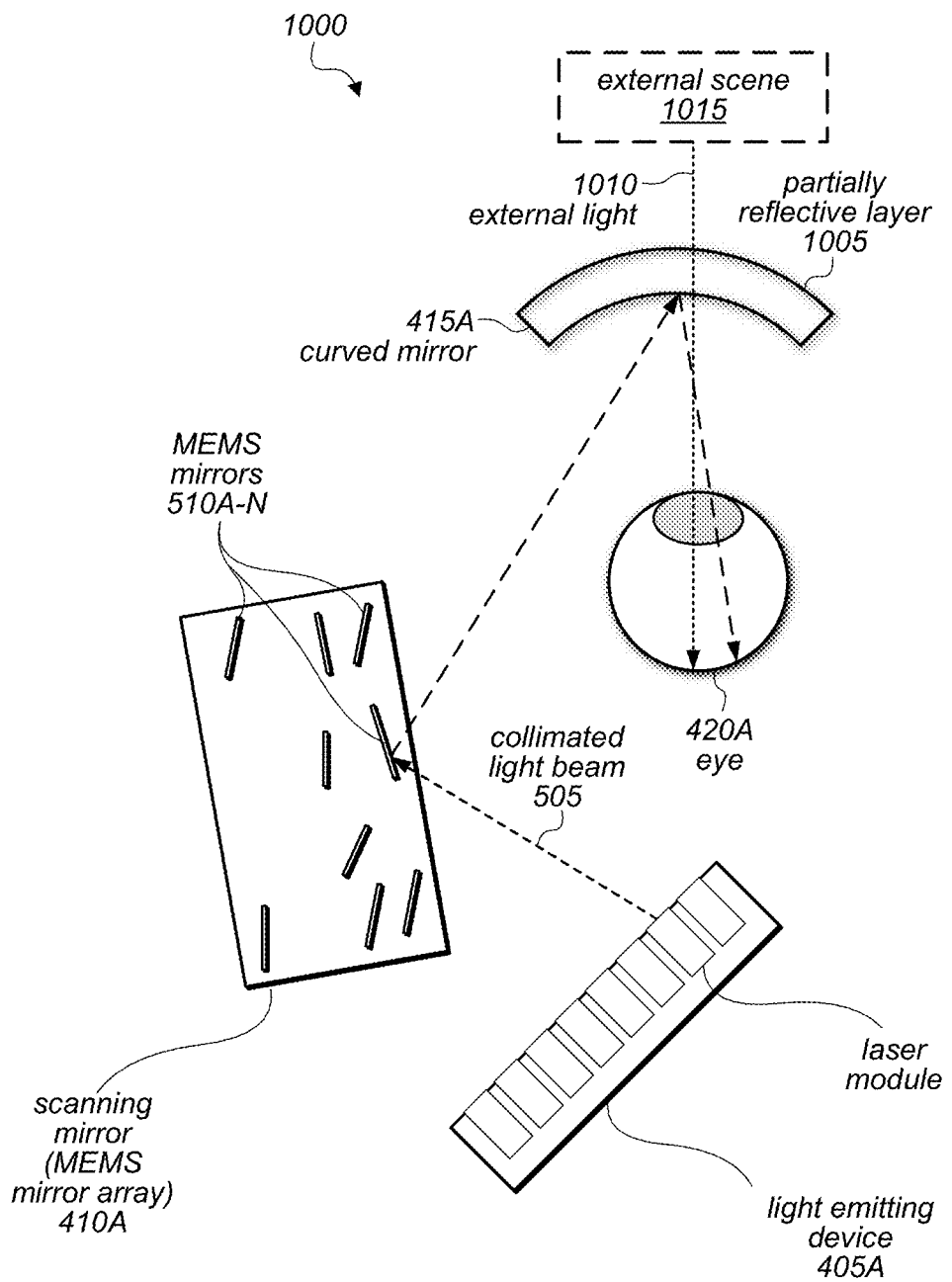
FIG. 18 is a logical block diagram of a device that provides augmented reality (AR) to a subject, according to some embodiments.

FIG. 18 illustrates an example of a system 1000 configured for augmented reality (AR), according to some embodiments. In some embodiments, a curved mirror, such as curved mirror 415A of FIG. 4, may include a partially reflective layer 1005 configured to allow a portion of external light 1010 from an external scene 1015 to pass from an opposite surface of curved mirror 415A through curved mirror 415A and reach the subject's eye 420A, while simultaneously reflecting collimated light beam 505 from an internal surface of curved mirror 415A towards the subject's eye 420A. In various embodiments, partially reflective layer 1005 may be a partially-silvered mirror, or the like. Augmented reality system 1000 thus enables the subject to see elements of both an external scene 1015 and the images corresponding to collimated light beam 505 (i.e., the field of view generated by light emitting device 405A and scanning mirror 410A raster scanning collimated light beam 505 across the inside surface of curved mirror 415A).

FIGS. 12-18 provide an example of a VR/AR device which may generate virtual reality or augmented reality images. However, numerous other types or configurations of systems or devices that implement virtual reality or augmented reality may be included in a VR/AR device.

Figure 19:
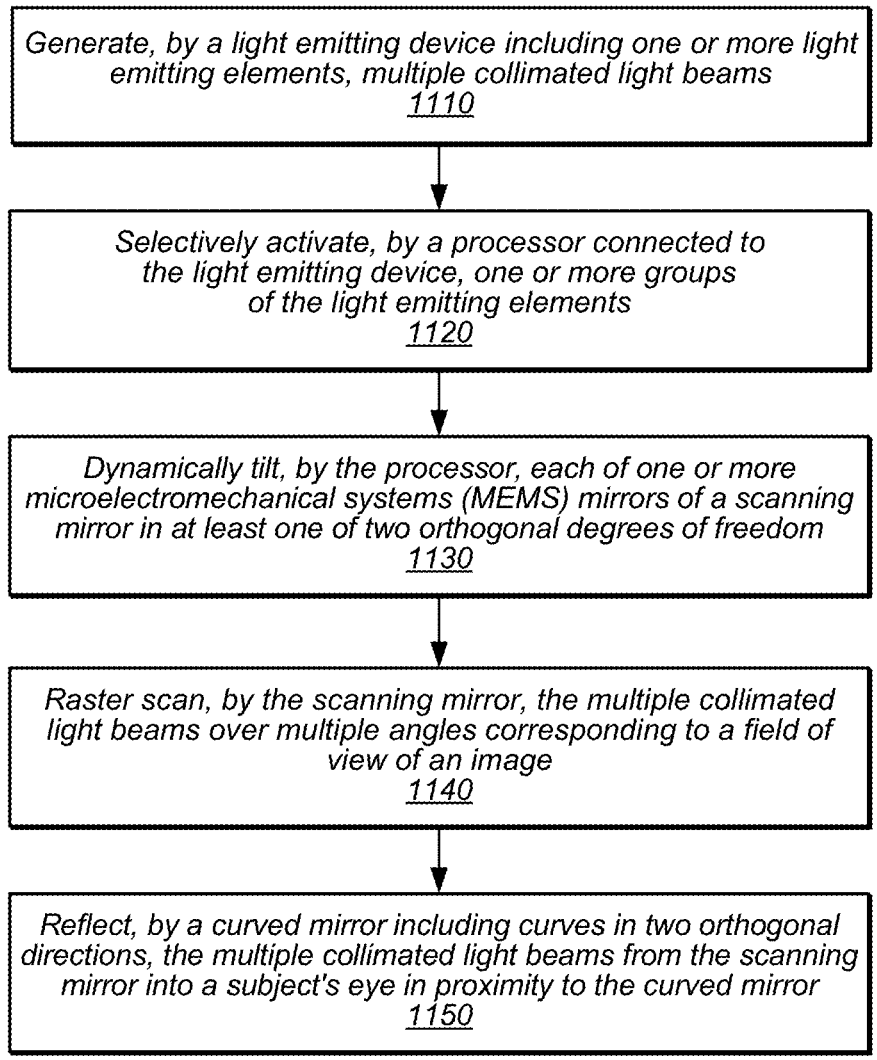
FIG. 19 is a high-level flowchart illustrating a method of operation for a virtual reality device, according to some embodiments.

FIG. 19 is a high-level flowchart illustrating a method of operation for a VR/AR device, according to some embodiments. The method of FIG. 19 may, for example, be implemented by embodiments of a VR/AR device as illustrated in FIGS. 12-18. In addition, in some embodiments, a VR/AR device may implement other methods and techniques such as those described above in reference to FIGS. 4A through 11. In some embodiments, a VR/AR device may further include technology, such as one or more image signal processors and/or image processing pipelines, that may apply one or more image processing techniques to virtual reality or augmented reality images.

As indicated at 1110 of FIG. 19, a light emitting device including one or more light emitting elements generates one or more collimated light beams. In some embodiments, the light emitting elements may be vertical cavity surface-emitting lasers (VCSELs) with respective focusing and/or collimation elements (e.g., dynamically adjustable focusing lenses). In some embodiments, the VCSELs may be organized in groups, with each group including a red VCSEL, a blue VCSEL, and a green VCSEL. As indicated at 1120, a processor connected to the light emitting device selectively activates one or more groups of the light emitting elements. As indicated at 1130, the processor dynamically tilts each of one or more MEMS mirrors of a scanning mirror in at least one of two orthogonal degrees of freedom. As indicated at 1140, the scanning mirror raster scans the multiple collimated light beams over multiple angles corresponding to a field of view of an image. As indicated at 1150, a mirror (e.g., an ellipsoid mirror) curved in two orthogonal directions reflects the collimated light beams from the scanning mirror into a subject's eye in proximity to the curved mirror. The collimated light beams reflected by the curved mirror may provide a virtual reality view to the subject.

FIGS. 20A and 20B illustrate embodiments of dynamically adjustable MEMS mirrors, according to some embodiments. As depicted in FIG. 20A, MEMS mirror 1205 may be configured to rotate a reflective surface across an x-axis based on an electrical current applied to MEMS mirror 1205 that changes the magnetic field(s) of a piezoelectric material applied to the flexing surfaces of the MEMS mirror 1205 in relation to a substrate of the MEMS mirror 1205, thereby causing the flexing surfaces to bend which results in rotating a reflective surface of the MEMS mirror 1205 in relation to the x-axis. Similarly, FIG. 20B depicts a reflective surface of MEMS mirror 1205 rotating across a y-axis in response to an electrical current that differently alters the magnetic field(s) of the piezoelectric material applied to the flexing surfaces of the MEMS mirror 1205, thereby causing the flexing surfaces to differently bend which results in rotating a reflective surface of the MEMS mirror 1205 in relation to the y-axis. In some embodiments, a scanning mirror may include multiple such MEMS mirrors 1205 configured to dynamically rotate in two orthogonal directions in response to commands from a processor.

A virtual reality device as described herein may thus scan high-resolution virtual reality images to a subject's retinas, and may reduce, minimize, or eliminate the effects of accommodation-convergence mismatch. Some embodiments of a virtual reality device as described herein may also employ gaze tracking technology to adapt the projection of the virtual images according to the orientation and spacing of the subject's eyes. Some embodiments of a virtual reality device as described herein may also provide augmented reality by using partially reflective curved mirrors that reflect virtual images to the subject's eyes, while allowing a portion of external light to pass through the curved mirrors to the subject's eyes.

What is claimed is:

1. A system, comprising:
a scanning mirror;
a substantially ellipsoid mirror;
a projector configured to emit light to the scanning mirror, wherein the scanning mirror is configured to reflect the light to the ellipsoid mirror as a scanned light field, and wherein the ellipsoid mirror is configured to reflect the scanned light field to a subject's eye to project an image to the subject's eye;
an adjustable focusing lens located on a path of the light between the projector and the scanning mirror, wherein the adjustable focusing lens is configured to be adjusted as the light is scanned across an azimuth angle of the ellipsoid mirror to change focus of the scanned light field at different positions on the ellipsoid mirror with respect to the azimuth angle; and
one or more controllers configured to adjust the adjustable focusing lens to change focus of the scanned light field at different positions on the ellipsoid mirror with respect to the azimuth angle as the light is scanned across the azimuth angle to:
compensate for changes in optical power across the ellipsoid mirror, or
alter a beam divergence of the scanned light field to match a distance for an object in the projected image, or
defocus parts of the projected image at which the subject is not looking.

2. The system of claim 1, wherein the scanning mirror is a two-dimensional (2D) scanning mirror.

3. The system of claim 1, wherein the projector comprises:
two or more light sources configured to generate the light as a combined beam of light; and
the scanning mirror, comprising a microelectromechanical systems (MEMS) scanning mirror configured to scan the combined beam to generate the scanned light field.

4. The system of claim 3, wherein the two or more light sources include red, green, and blue lasers.

5. The system of claim 3, wherein the projector further comprises two or more beam splitters configured to combine light beams generated by the two or more light sources to form the combined beam and to direct the combined beam to the MEMS scanning mirror that reflects the combined beam into the scanned light field.

6. The system of claim 1, further comprising:
a light source, wherein the light source is configured to emit a light beam that is reflected by the scanning mirror and the ellipsoid mirror to strike the subject's eye, wherein the light beam is substantially centered on the scanned light field when reflected by the scanning mirror and the ellipsoid mirror.

7. The system of claim 6, further comprising:
a position sensing detector;
wherein at least a portion of the light beam reflected by the ellipsoid mirror enters the pupil of the eye and is reflected by the retina of the eye to form a return light beam that passes back through the pupil to strike the ellipsoid mirror, is reflected by the ellipsoid mirror to the scanning mirror, and is directed from the scanning mirror to the position sensing detector; and
wherein the position sensing detector is configured to detect position of the return light beam relative to a center position of the position sensing detector.

8. A method, comprising:
emitting, by a projector, light to a scanning mirror;
reflecting, by a scanning mirror, the light to a substantially ellipsoid mirror as a scanned light field;
reflecting, by the ellipsoid mirror, the scanned light field to a subject's eye to project an image to the subject's eye; and
adjusting, by one or more controllers as the scanned light field is scanned across an azimuth angle of the ellipsoid mirror, an adjustable focusing lens located on a path of the light between the projector and the scanning mirror, to change focus of the scanned light field at different positions on the ellipsoid mirror with respect to the azimuth angle as the light is scanned across the azimuth angle to:
  compensate for changes in optical power across the ellipsoid mirror, or
  alter a beam divergence of the scanned light field to match a distance for an object in the projected image, or
  defocus parts of the projected image at which the subject is not looking.

9. The method of claim 8, wherein said adjusting the focusing lens comprises adjusting the focusing lens as the scanned light field is scanned across an azimuth angle of the ellipsoid mirror to change focus of the scanned light field at different positions on the ellipsoid mirror with respect to the azimuth angle.

10. The method of claim 9, wherein the adjustable focusing lens is not adjusted with the elevation angle during the scanning.

11. The method of claim 8, wherein the scanning mirror is a two-dimensional (2D) scanning mirror and said reflecting the light as a scanned light field to a substantially ellipsoid mirror is performed by the two-dimensional scanning mirror.

12. The method of claim 8,
wherein the scanning mirror comprises a MEMS scanning mirror;
wherein said emitting comprises generating the light as two or more light beams emitted by two or more light sources; and
wherein said adjusting comprises adjusting the adjustable focusing lens located on a path of the light between the two or more light sources and the MEMS scanning mirror to change focus of the scanned light field as the scanned light field is scanned across the ellipsoid mirror.

13. The method of claim 8, further comprising:
emitting, by another light source, a light beam to the scanning mirror;
reflecting, by the scanning mirror, the light beam to the ellipsoid mirror; and
reflecting, by the ellipsoid mirror, the light beam to the subject's eye, wherein the light beam is substantially centered on the scanned light field when reflected by the scanning mirror and the ellipsoid mirror.

14. The method of claim 13, further comprising:
reflecting, by the ellipsoid mirror, a return light beam from a retina of the subject's eye to the scanning mirror;
directing, by the scanning mirror, the return light beam to a position sensing detector; and
detecting, by the position sensing detector, position of the return light beam relative to a center position of the position sensing detector.

15. A device, comprising:
first and second substantially ellipsoid mirrors;
a frame configured to hold the first and second ellipsoid mirrors;
first and second scanning mirrors;
first and second projectors, individually configured to emit respective light to respective ones of the scanning mirrors, wherein the scanning mirrors are configured to reflect the respective light to respective ones of the ellipsoid mirrors as scanned light fields, and wherein the ellipsoid mirrors are configured to reflect the scanned light fields to a subject's eyes to project one or more images to the subject's eyes;
first and second adjustable focusing lenses, individually located on respective paths of the light between the projectors and the scanning mirrors, wherein the adjustable focusing lenses are configured to be adjusted as the scanned light fields are scanned across an azimuth angle of the ellipsoid mirror to change focus of the scanned light fields at different respective positions on the ellipsoid mirror with respect to the azimuth angle; and
one or more controllers configured to adjust the adjustable focusing lenses to change focus of the scanned light fields at different respective positions on the ellipsoid mirror with respect to the azimuth angle as the light is scanned across the azimuth angle to:
  compensate for changes in optical power across the ellipsoid mirrors, or
  alter a beam divergence of the scanned light fields to match a distance for one or more objects in the projected one or more images, or
  defocus parts of the projected one or more images at which the subject is not looking.

16. The device of claim 15, wherein at least one of the first and second projectors comprise:
two or more light sources configured to generate the respective light as a combined light beam;
a microelectromechanical systems (MEMS) scanning mirror configured to scan the combined light beam to generate the respective scanned light field; and
at least one adjustable focusing lens located on the path of the one combined light beam between the two or more light sources and the MEMS scanning mirror, wherein the at least one adjustable focusing lens is configured to be adjusted as the scanned light field is scanned across the respective ellipsoid mirror to adjust focus of the scanned light field at the respective ellipsoid mirror.

17. The device of claim 15, further comprising:
a light source, wherein the light source is configured to emit a light beam that is reflected by one of the scanning mirrors and one of the ellipsoid mirrors to strike the subject's eye, wherein the light beam is substantially centered on the scanned light field when reflected by the scanning mirror and the ellipsoid mirror; and
a position sensing detector;
wherein at least a portion of the light beam reflected by the ellipsoid mirror enters the pupil of the eye and is reflected by the retina of the eye to form a return light beam that passes back through the pupil to strike the ellipsoid mirror, is reflected by the ellipsoid mirror to the scanning mirror, and is directed from the scanning mirror to the position sensing detector; and
wherein the position sensing detector is configured to detect position of the return light beam relative to a center position of the position sensing detector.

* * * * *